(12) United States Patent
Sugaya et al.

(10) Patent No.: US 6,898,171 B1
(45) Date of Patent: May 24, 2005

(54) INFORMATION RECORDING MEDIUM WITH INDEX HEADER

(75) Inventors: Toshihiro Sugaya, Kitasoma-gun (JP); Hiroshi Hasegawa, Yokosuka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 877 days.

(21) Appl. No.: 09/721,763

(22) Filed: Nov. 27, 2000

(30) Foreign Application Priority Data

Nov. 26, 1999 (JP) .......................................... 11-336613

(51) Int. Cl.⁷ ................................................. B11B 7/24
(52) U.S. Cl. ................................. 369/275.3; 369/59.25
(58) Field of Search ........................... 369/275.4, 44.26, 369/47.22, 59.25, 275.3, 53.2, 275.5, 30.09

(56) References Cited

U.S. PATENT DOCUMENTS

| | | | | |
|---|---|---|---|---|
| 4,020,278 A | * | 4/1977 | Carre et al. ............... | 369/275.5 |
| 4,566,088 A | * | 1/1986 | Yoshida et al. ........... | 369/44.38 |
| 4,827,462 A | * | 5/1989 | Flannagan et al. ........ | 369/30.09 |
| 5,499,232 A | * | 3/1996 | Hardwick ................. | 369/275.3 |
| 5,808,978 A | * | 9/1998 | Wang et al. .............. | 369/44.28 |
| 5,870,375 A | * | 2/1999 | Maeda et al. ............. | 369/275.3 |
| 5,883,867 A | * | 3/1999 | Yamamuro ................ | 369/275.3 |
| 6,587,417 B2 | * | 7/2003 | Okamoto et al. ......... | 369/275.3 |

FOREIGN PATENT DOCUMENTS

| | | |
|---|---|---|
| JP | 09-27127 | 1/1997 |
| JP | 09-106578 | 4/1997 |

* cited by examiner

*Primary Examiner*—Tan Dinh
(74) *Attorney, Agent, or Firm*—Oblon, Spivak, McClelland, Maier & Neustadt, P.C.

(57) ABSTRACT

A disk-shaped information recording medium has spiral tracks in which land- and groove-shaped tracks are alternately switched in units of rounds, and one index header which is aligned in the radial direction of a disk and is allocated at only the boundary between the land- and groove-shaped tracks.

29 Claims, 16 Drawing Sheets

| B0,0 | B0,1 | ... | B0,170 | B0,171 | B0,172 | ... | B0,181 |
|---|---|---|---|---|---|---|---|
| B1,0 | B1,1 | ... | B1,170 | B1,171 | B1,172 | ... | B1,181 |
| ... | ... | ..... | ..... | ..... | ..... | ..... | ..... |
| B190,0 | B190,1 | ... | B190,170 | B190,171 | B190,172 | ... | B190,181 |
| B191,0 | B191,1 | ... | B191,170 | B191,171 | B191,172 | ... | B191,181 |
| B192,0 | B192,1 | ... | B192,170 | B192,171 | B192,172 | ... | B192,181 |
| ... | ... | ... | ... | ... | ... | ... | ... |
| B207,0 | B207,1 | ... | B207,170 | B207,171 | B207,172 | ... | B207,181 |

172 BYTES (rows 0–171), PI 10 BYTES (rows 172–181)
192 ROWS (B0–B191), PO 16 ROWS (B192–B207)

FIG. 7

| ZONE | RADIUS (mm) | NUMBER OF WOBBLES | NUMBER OF SYNC FRAMES | NUMBER OF BYTES | NUMBER OF TRACKS |
|---|---|---|---|---|---|
| 0 | 24.1 | 10264 | 1283 | 119319 | 970 |
| 1 | 24.44 | 10408 | 1301 | 120993 | 970 |
| ⋮ | ⋮ | ⋮ | ⋮ | ⋮ | ⋮ |
| 49 | 40.66 | 17320 | 2165 | 201345 | 970 |
| ⋮ | ⋮ | ⋮ | ⋮ | ⋮ | ⋮ |
| 98 | 57.21 | 24376 | 3047 | 283371 | 970 |
| 99 | 57.55 | 24520 | 3065 | 285045 | 970 |

FIG. 10

| TRACK NUMBER | IH | STRUCTURE OF RECORDING FIELDS OF EACH TRACK (1,281 SYNC FRAMES/TRACK) | | | |
|---|---|---|---|---|---|
| | | 15 | 15 | 15 | 17 |
| 0 | 2 | 420 | 420 | 420 | 21 |
| 1 | 2 | 403 | 420 | 420 | 38 |
| ⋮ | | 16  15 | 15 | 15 | 17 |
| ⋮ | | 16  15 | 15 | 15 | 17 |
| 24 | 2 | 12  420 | 420 | 420 | 9 |
| 25 | 2 | 415 | 420 | 420 | 26 |
| 26 | 2 | 398 | 420 | 420 | 43 |
| ⋮ | | | ⋮ | | |
| 969 | 2 | 301 | 420 | 420 | 140 |

FIG. 11

INFORMATION RECORDING MEDIUM WITH INDEX HEADER

CROSS-REFERENCE TO RELATED APPLICATIONS

This application is based upon and claims the benefit of priority from the prior Japanese Patent Application No. 11-336613, filed Nov. 26, 1999, the entire contents of which are incorporated herein by reference.

BACKGROUND OF THE INVENTION

The present invention relates to an information recording medium such as a rewritable optical disk or the like. The present invention also relates to an information recording apparatus and method for recording information on an information recording medium such as a rewritable optical disk or the like. Furthermore, the present invention relates to an information reproduction apparatus and method for reproducing information recorded on the rewritable information recording medium.

In recent years, rewritable optical disks on which data can be randomly recorded have been extensively studied and developed. Of such disks, a rewritable optical disk called a DVD-RAM having a diameter of 120 mm is known. The DVD-RAM has concentric zones. The DVD-RAM is controlled at different rotational speed in units of zones. That is, outer zones have lower rotational speeds. However, the rotational speed is controlled to be constant within a single zone. Such rotation control is called ZCLV.

On each zone, a zigzag spiral track is formed. This zigzag pattern is called a wobble. The spiral track is defined by a groove track and land track, and by tracing the spiral track, the groove and land tracks alternately appear every round. A plurality of sector fields are formed along the spiral track. One sector field is formed of a header field and recording field. The header field records address data by embossed pits. That is, the respective sector fields hold address data.

If one round of spiral track is counted as one track, the respective zones have the same number of tracks. Also, tracks in a given zone have the same number of sector fields. Furthermore, the difference between the numbers of sector fields per track in two neighboring zones (outer and inner peripheral zones) is 1. That is, the number of sector fields per track in an outer peripheral zone is larger by 1 than that of an inner peripheral zone. In this way, by setting the number of sector fields per track in an outer peripheral zone to be larger than that of an inner peripheral zone, the recording efficiency in the DVD-RAM is improved. Since the respective tracks in a single zone have the same number of sector fields, the header field positions in that zone can be linearly aligned in the radial direction of the disk.

On the DVD-RAM, data are recorded in units of ECC blocks appended with error correction codes. Each block consists of 16 sector data. One sector data is recorded in the recording field of one sector field. The data recording scheme in units of blocks is the same as that of a DVD-ROM as a read-only optical disk.

As described above, since the header field positions in a single zone are linearly aligned in the radial direction of the disk, each recording field is not influenced by embossed pits included in the header field. Since address data are assigned in advance in units of sector fields, an arbitrary address can be accessed without initializing a disk. Furthermore, since address data can be obtained from each sector field as needed, the seek time can be shortened, and data can be randomly written in the recording field of an arbitrary sector field.

However, when each sector field has address data, the storage capacity decreases accordingly. Also, buffer fields and the like are required in addition to those used to record target data, and the storage capacity decreases accordingly. The buffer fields include those used to cope with changes in sector field length caused by rotational variation and eccentricity of a disk upon recording/reproduction of data, and those used to cope with random shifts of recording positions when phase change recording is used.

For the reasons described above, the storage capacity of the DVD-RAM is about 10% smaller than that of the DVD-ROM. Furthermore, the disk is segmented into a plurality of zones from the inner periphery toward the outer periphery, and upon jumping from a given zone to another, the recording frequency changes largely. For this reason, when data such as video data are to be recorded in a large quantity, a long time is required to make the disk cope with a change in frequency. Such long time decreases the transfer rate and makes seamless recording difficult. Address data recorded as embossed pits is located between the land and track grooves, and is reproduced at the tail of a beam spot that tracks the land or groove. For this reason, high-precision embossed pit recording is required, and it is difficult to adjust an optical head to precisely reproduce embossed pits, resulting in an increase in cost.

A prevalently used CD-R or CD-RW does not adopt any scheme of assigning address data in units of sector fields. In the CD-R or CD-RW, address data is reflected as an FM signal in a wobble of a track. In a DVD-R, address data is recorded using land prepits which do not impose any influences upon reproduction by a DVD-ROM drive. In these disks, it is difficult to efficiently record data at arbitrary positions. Also, in these disks, a recording end process is required after data recording, and mostly dummy data are recorded over several hundred tracks. Such recording scheme is suitable for recording continuous data such as video data, but is not suitable for recording small fragments of data such as computer data.

As described above, when the conventional optical disk recording scheme adopts a format suitable for recording random data, such format results in recording efficiency drop or is not suitable for continuous recording. Conversely, when a format suitable for continuous recording is adopted, it is not suitable for recording random data.

BRIEF SUMMARY OF THE INVENTION

The present invention has been made to solve the aforementioned problems. It is an object of the present invention to provide the following information recording medium, information recording apparatus, information recording method, information reproduction apparatus, and information reproduction method:

(1) an information recording medium with high recording efficiency and, more particularly, an information recording medium which can record a large amount of continuous data such as video data and also small fragments of data in units of ECC blocks such as PC data at arbitrary positions;

(2) an information recording apparatus and method which can record information on an information recording medium with high recording efficiency and, more particularly, an information recording medium which can record a large amount of continuous data such as video data and also small fragments of data in units of ECC blocks such as PC data at arbitrary positions so as to utilize features of the information recording medium; and (3) an information reproduction apparatus and method which reproduce information recorded on an information recording medium with high recording efficiency and, more particularly, an information recording medium which can record a large amount of continuous data such as video data and also small fragments of data in units of ECC blocks such as PC data at arbitrary positions.

In order to solve the above problems and to achieve the above objects, the information recording medium, information recording apparatus, information recording method, information reproduction apparatus, and information reproduction method of the present invention have the following arrangements.

(1) A disk-shaped information recording medium comprises spiral tracks, and at least one index header which is aligned in a radial direction of a disk to partially intercept the spiral tracks.

(2) A disk-shaped information recording medium comprises wobbled spiral tracks, and at least one index header which is aligned in a radial direction of a disk to partially intercept the spiral tracks, and in which address data of a track is recorded as an embossed pattern. An information recording apparatus for recording information on the information recording medium comprises recording means for recording a recording field having a header field and data field on the spiral tracks on the basis of address data recorded as an embossed pattern in the index header, and recording address data of the recording field in the header field.

(3) A disk-shaped information recording medium comprises wobbled spiral tracks, and at least one index header which is aligned in a radial direction of a disk to partially intercept the spiral tracks, and in which address data of a track is recorded as an embossed pattern. An information recording method for recording information on the information recording medium comprises the step of recording a recording field having a header field and data field on the spiral tracks on the basis of address data recorded as an embossed pattern in the index header, and recording address data of the recording field in the header field.

(4) A disk-shaped information recording medium comprises wobbled spiral tracks, and at least one index header which is aligned in a radial direction of a disk to partially intercept the spiral tracks, and in which address data of a track is recorded as an embossed pattern. The spiral tracks have a plurality of recording fields each having a predetermined length, each recording field has a header field and data field, the header field records address data, and the data field records user data. An information reproduction apparatus for reproducing information from the information recording medium comprises data reproduction means for reproducing target data recorded in the data field of the recording field on the basis of the address data recorded in the header field of the recording field.

(5) A disk-shaped information recording medium comprises wobbled spiral tracks, and at least one index header which is aligned in a radial direction of a disk to partially intercept the spiral tracks, and in which address data of a track is recorded as an embossed pattern. The spiral tracks have a plurality of recording fields each having a predetermined track length, each recording field has a header field and data field, the header field records address data, and the data field records user data. An information reproduction method for reproducing information from the information recording medium comprises the step of reproducing target data recorded in the data field of the recording field on the basis of the address data recorded in the header field of the recording field.

An information recording medium of the present invention has a plurality of zones from the inner to outer periphery thereof, each zone includes a predetermined number of tracks, and the number of wobbles per track in a single zone is the same. The rotational speed of an optical disk is determined based on a frequency obtained by reproducing wobbles, and the frequency upon recording data is also determined from this frequency obtained by reproducing wobbles. By switching tracking servo using an index header as a trigger, a single spiral track can undergo recording/reproduction. A single spiral track means a track in which land and groove tracks alternately appear every round.

Upon recording data for the first time without physically formatting a disk, address data of physical tracks are read out from index headers each of which is located at one position per round. The physical position within one round is accurately determined by counting from the index header. Theoretically, data is recorded in units of ECC blocks. However, in practice, a header field including address data and data field including an ECC block are recorded together in one recording field. The header field is never rewritten unless the disk is re-formatted. Upon rewriting on a disk on which data has already been recorded, only the data field is rewritten. In an optical disk of phase change recording scheme, as in a DVD-RAM, the data field has a gap as measures against deterioration of the leading and trailing edges, and a buffer for absorbing eccentricity and rotational variation. Since the rotational speed and recording frequency of the disk are obtained from wobbles, the buffer area can be minimized.

When a recording field crosses an index header, the recording field is broken up into two sub recording fields, i.e., first and second sub recording fields to have the index header as a boundary. Each sub recording field has at least a data field, and also a connection field for connecting the two sub recording fields as a part of the data field. Alternatively, each sub recording field has a connection field for connecting the two sub recording fields independently of the data field. In each data field, one ECC block data is divisionally set. The first sub recording field has header and data fields, and a mark indicating that data is interrupted is set in the connection field included in this first sub recording field. The second sub recording field has at least a data field, and a mark indicating that data is restarted is set in the connection field included in the second sub recording field. In order to improve reliability, the second sub recording field may have a header field. In this case, the first and second sub recording fields have basically the same format as that of the recording field. In this case, the header fields of the first and second sub recording fields record identical address data.

Therefore, according to the present invention, even before an optical disk is physically formatted, ECC block data can be accurately written at an arbitrary physical address, and both continuous and random data can be efficiently recorded. Since data are recorded in units of ECC blocks, a portion other than data can be minimized compared to a DVD-RAM on which data are recorded in units of sectors. That is, the information recording medium of the present invention has higher recording efficiency than the DVD-RAM. Since no embossed pits are required to be aligned in the radial direction at very small intervals (sector field intervals), the number of zones can be greatly increased. In this manner, a change in frequency between neighboring zones can be smaller than a change in allowable recording density or allowable rotational variation, thus allowing seamless recording across different zones.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 shows the data format of an ECC block recorded in the recording field and sub recording fields recorded on the spiral track formed on the optical disk shown in FIG. 1;

FIG. 10 shows various parameters in respective zones specified on the optical disk shown in FIG. 1;

FIG. 11 shows recording fields recorded on the respective tracks of zone 0;

DETAILED DESCRIPTION OF THE INVENTION

A preferred embodiment of the present invention will be described hereinafter with reference to the accompanying drawings.

Figure 1A:
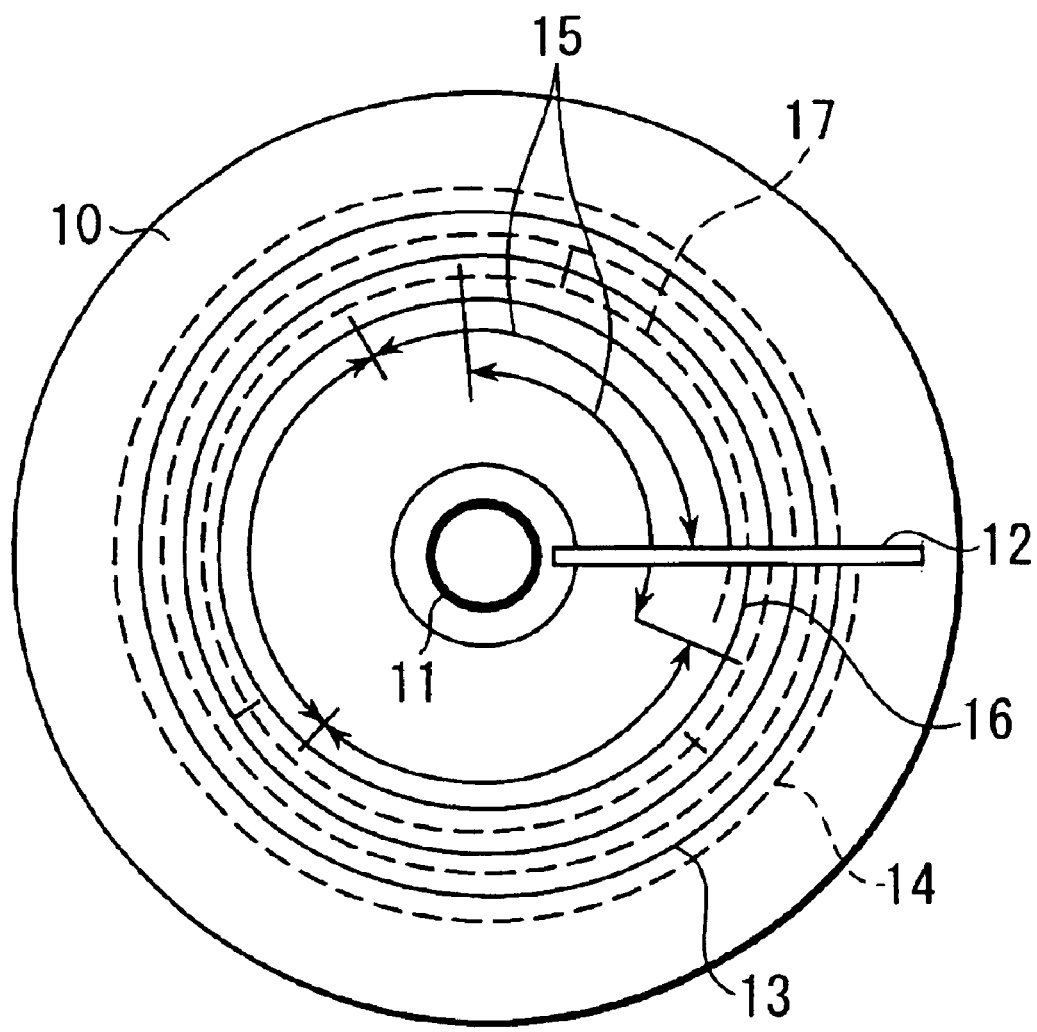
FIGS. 1A to 1C show an optical disk according to an embodiment of an information recording medium of the present invention and, more particularly, spiral tracks and index headers formed on the optical disk.
Figure 1B:
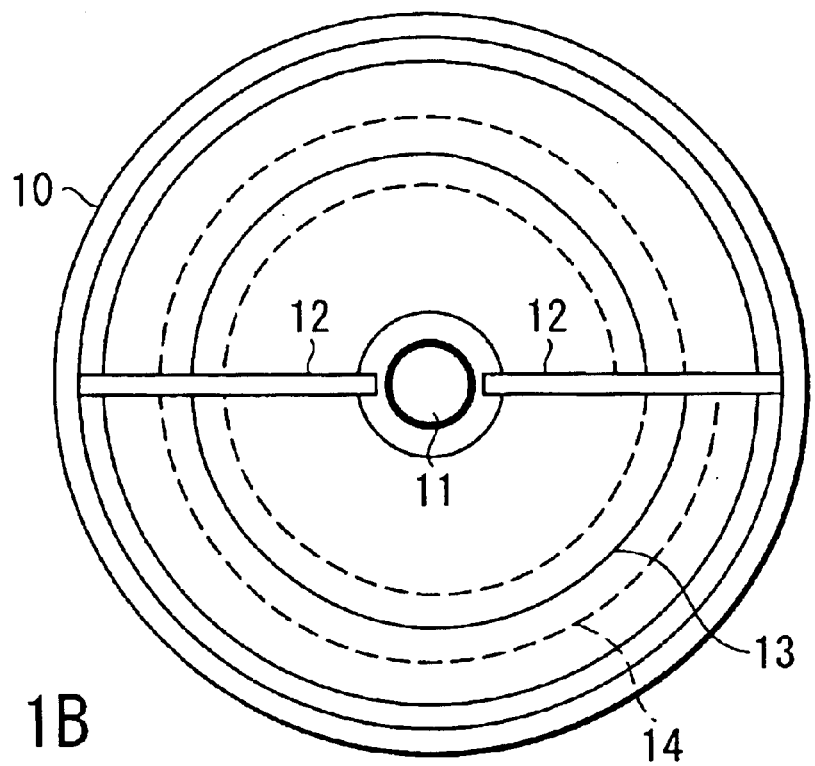
Figure 1C:
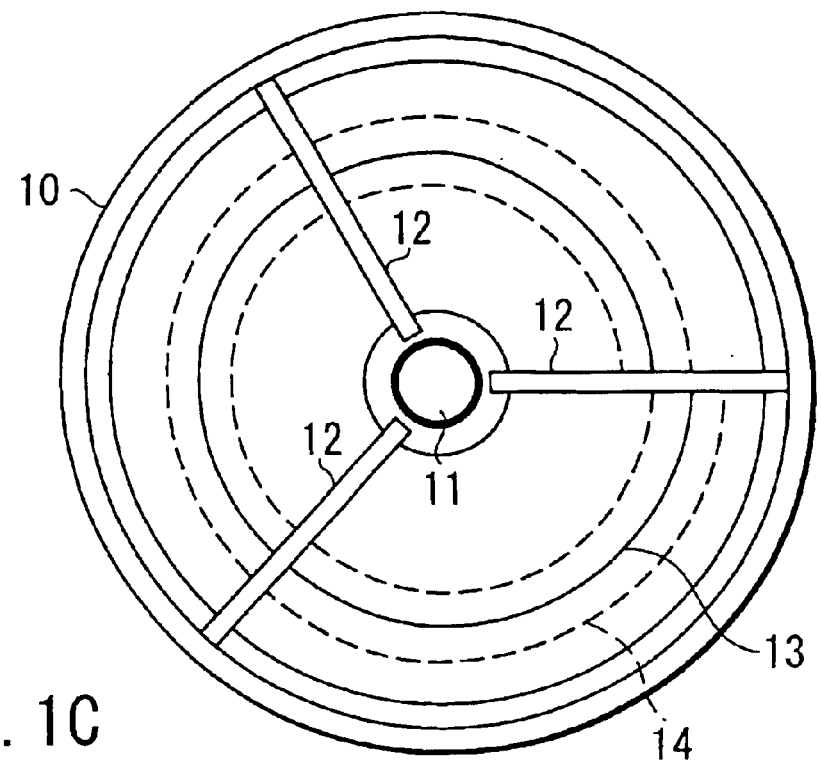
Figure 2:
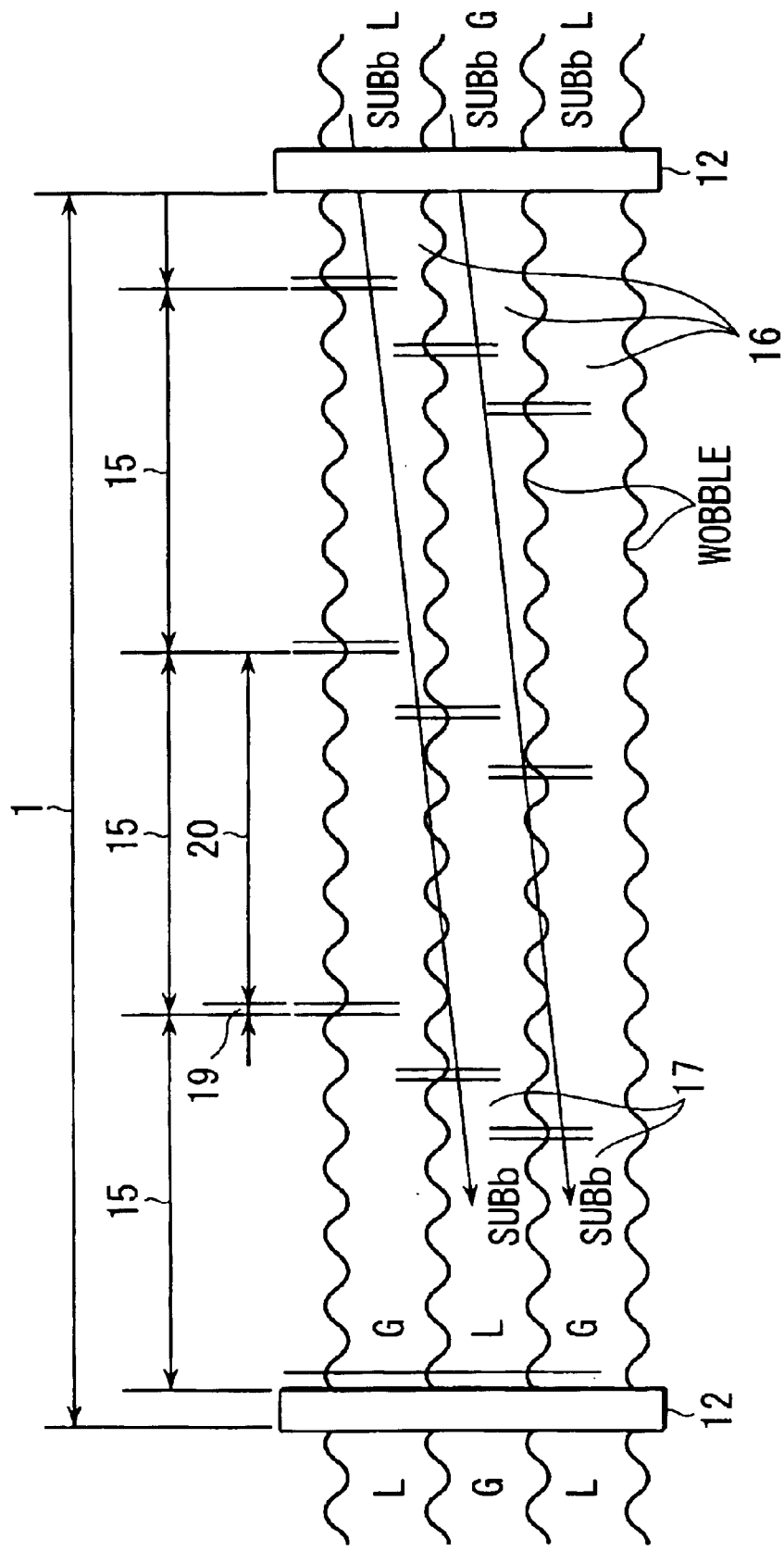
FIG. 2 shows the spiral tracks and index headers formed on the optical disk shown in FIG. 1 in an enlarged scale, and also recording fields and sub recording fields recorded on the spiral tracks.
Figure 3:
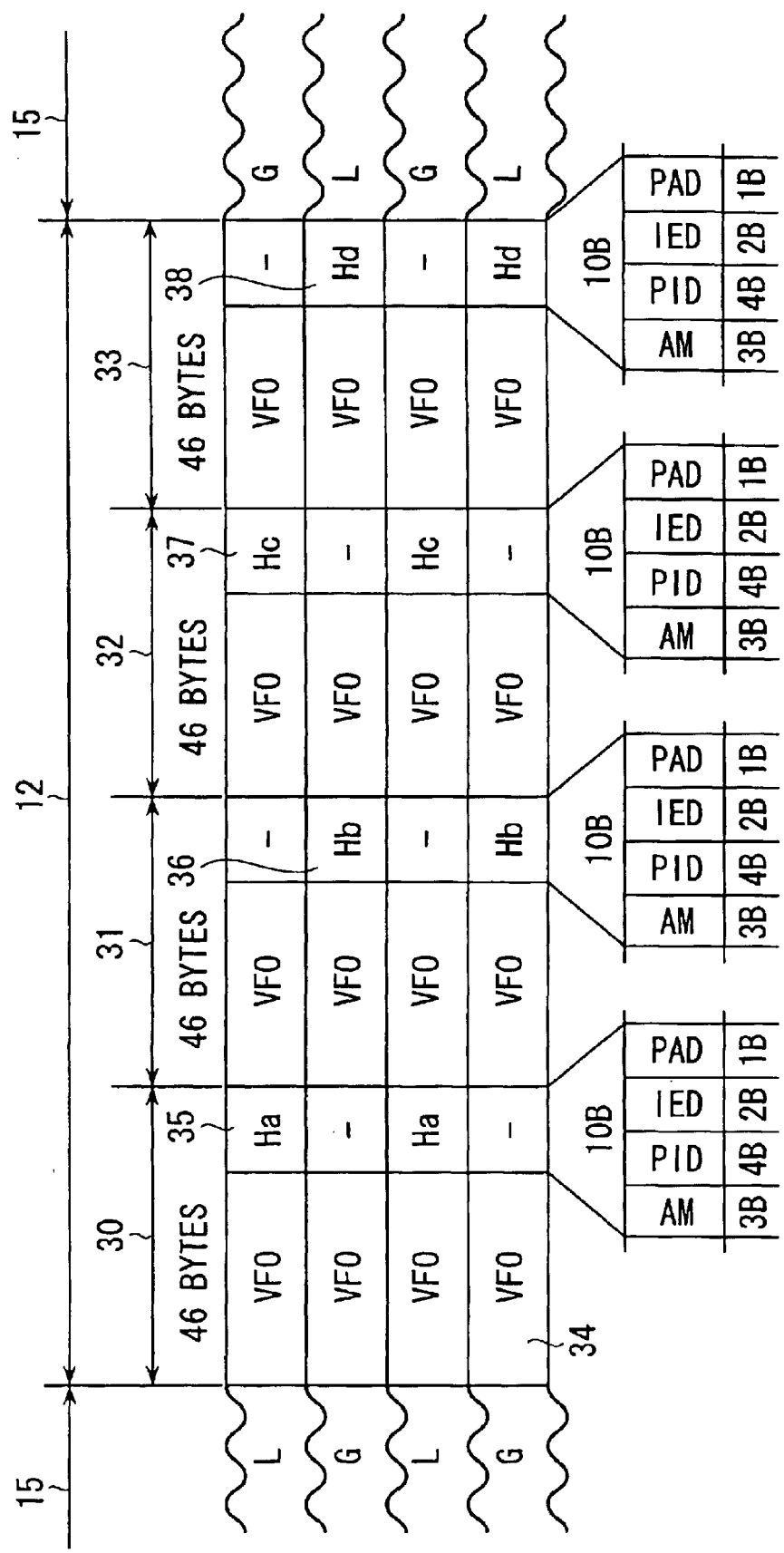
FIG. 3 shows the data structure of the index header formed on the optical disk shown in FIG. 1.
Figure 4:
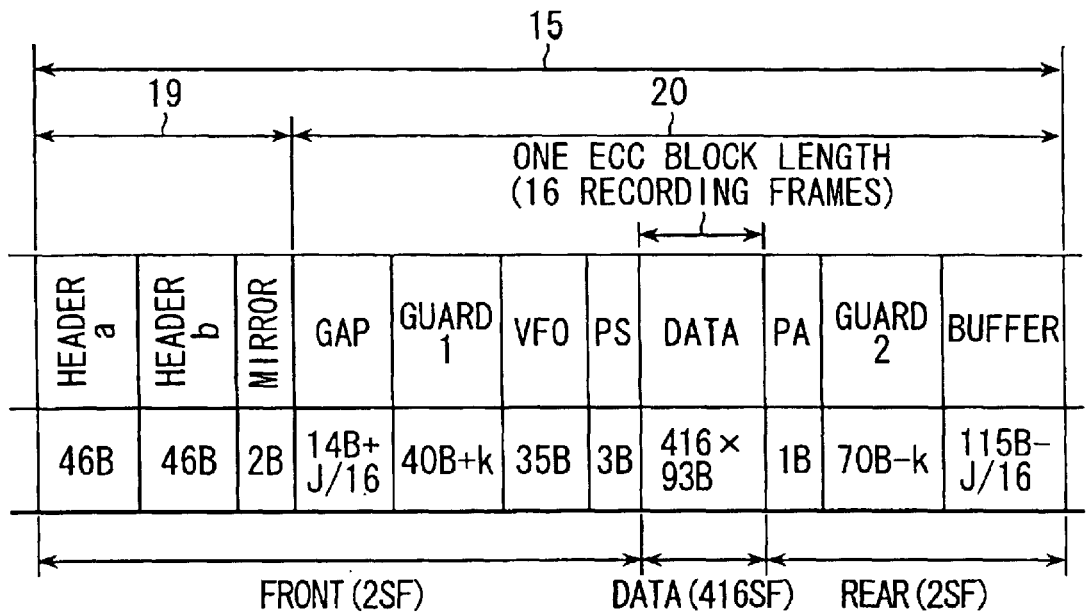
FIG. 4 shows the data structure of the recording field recorded on the spiral track formed on the optical disk shown in FIG. 1.
Figure 5B:
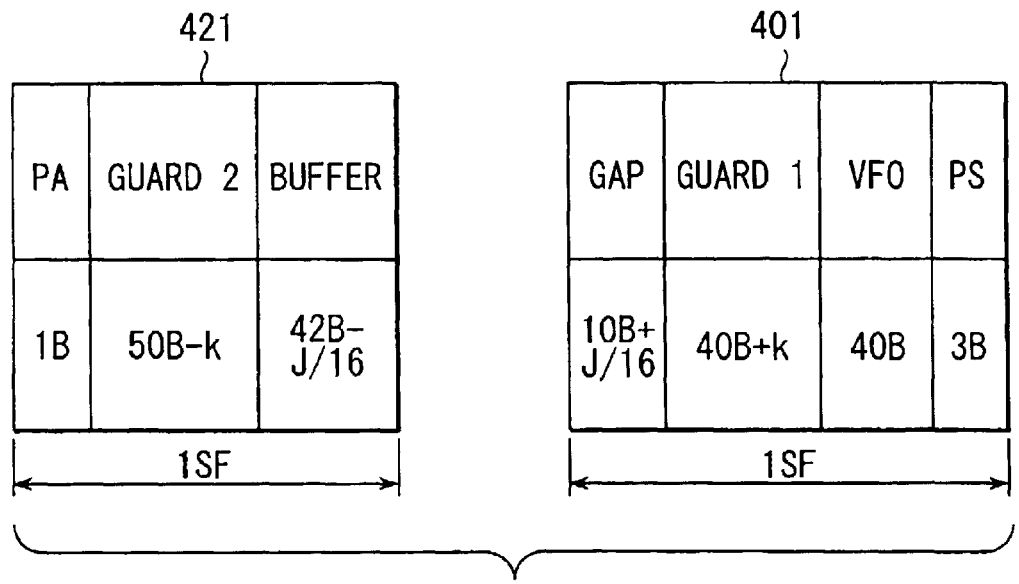
FIG. 5B shows an example of the format of the connection field in the sub recording field.
Figure 5A:
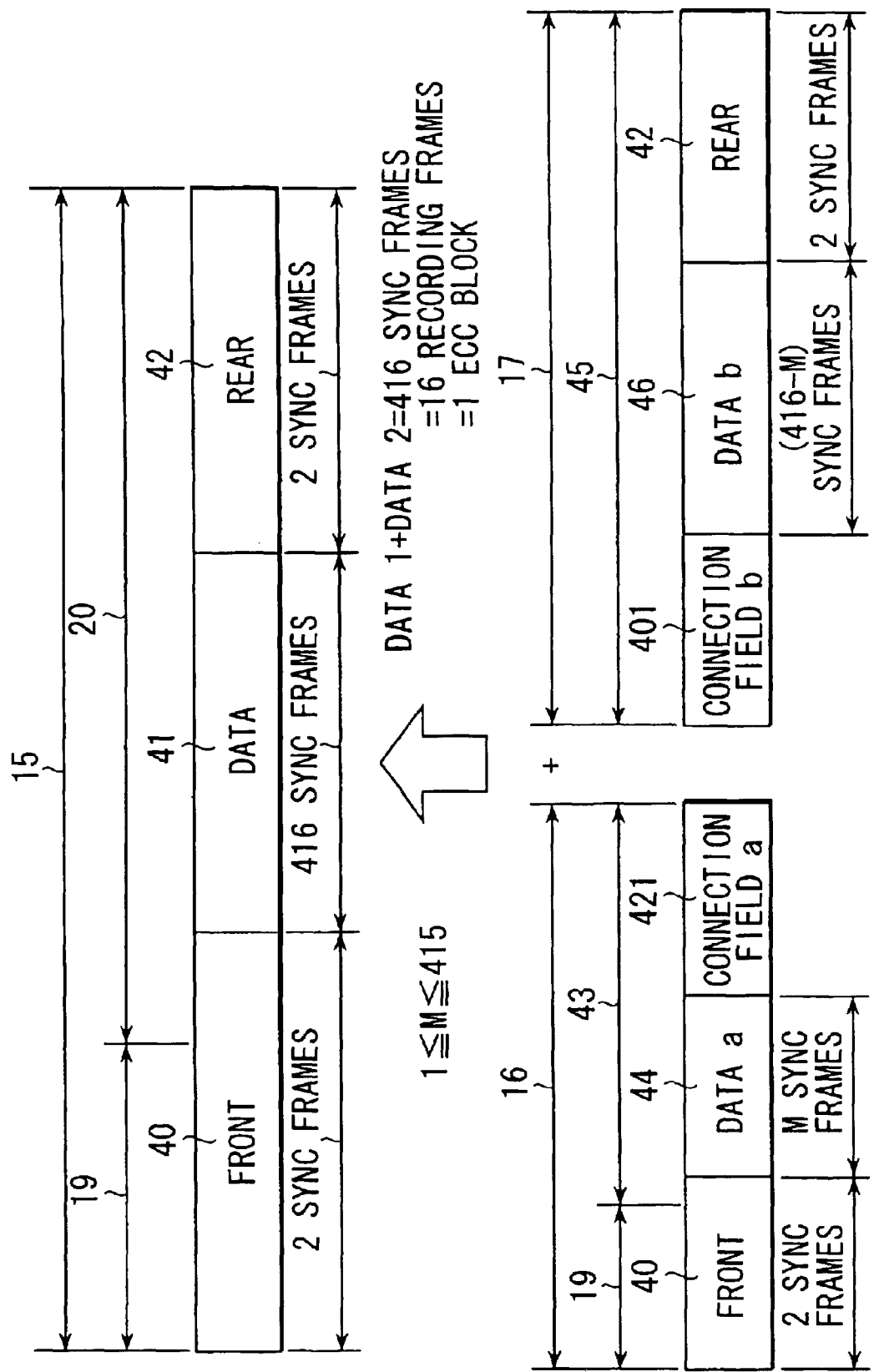
FIGS. 5A and 5D show the relationship between the recording field and sub recording fields recorded on the spiral track formed on the optical disk shown in FIG. 1, and also the data structure (with a connection field) of the sub recording fields.
Figure 5C:
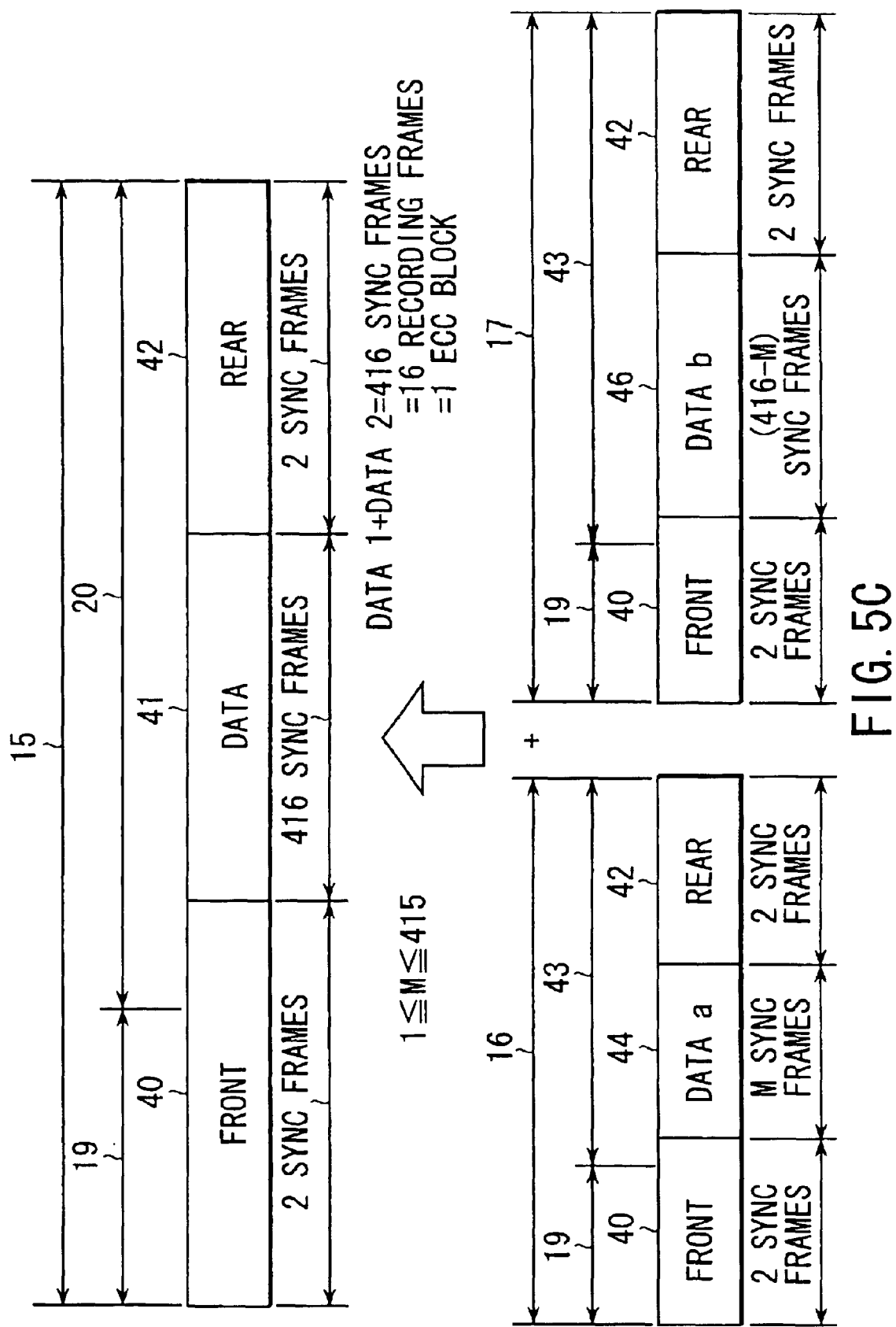
FIG. 5C shows the relationship between the recording field and sub recording fields recorded on the spiral track formed on the optical disk shown in FIG. 1, and also the data structure (connection field structure equal to FRONT or REAR structure) of the sub recording fields.

A rewritable optical disk according to an embodiment of an information recording medium of the present invention will be described below. FIG. 1 shows the overall optical disk, FIG. 2 shows the track structure of the optical disk, FIG. 3 shows an example of an index header, FIG. 4 shows an example of a recording field, FIG. 5A shows the relationship between the recording field and sub recording fields and also the data structure (with a connection field) of the sub recording fields, FIG. 5B shows an example of the structure of the connection field in the sub recording field, and FIG. 5C shows the relationship between the recording field and sub recording fields and also the data structure (connection field structure equal to FRONT or REAR structure) of the sub recording fields.

As shown in FIG. 1, an optical disk 10 has spiral tracks (recording tracks) in which wobbled land-shaped land tracks 14 and wobbled groove-shaped groove tracks 13 alternately appear every round. The optical disk 10 has index headers 12 which are aligned in the radial direction of the disk to locally intercept the spiral tracks. Furthermore, the optical disk 10 has a clamp hole 11 used to clamp the optical disk.

The optical disk 10 can record data on both the land and groove tracks to be suitable for high recording density. Such recording is called land & groove recording. For example, upon tracing the spiral track starting from the index header 12, a groove track 13 for one round, index header 12, land track 14 for one round, index header 12, groove track 13 for one round, index header 12, and land track 14 for one round appear in turn. That is, the index headers 12 are aligned on the optical disk 10 at the boundaries between the land and groove tracks 14 and 13 so that the index header 12 appears once per round of the track upon scanning the light beam along the spiral track.

However, the present invention is not limited to this. For example, upon scanning the light beam along the spiral track, index headers 12 may be aligned at two positions on the disk so that they appear twice per round of the track. Furthermore, index headers 12 may be aligned at three or more positions on the disk. If more index headers are provided in each track, the addresses recorded in each index header will be read more reliably. Generally, the more index headers in each track, the lower the formatting efficiency. In this case, the intervals between the index headers become shorter. Nonetheless, this renders the buffer and the like shorter. If each of the index headers is, for example, a one sync frame (SF), the decrease in the formatting efficiency can be suppressed.

The spiral track is wobbled in correspondence with a sine-wave wobble signal, as shown in FIG. 2. The optical disk 10 has a plurality of doughnut-shaped zones having different diameters from the inner to the outer periphery side. Each zone includes a predetermined number of rounds of tracks. The number of wobbles per round of the track included in a given zone is determined to be constant. Upon reproducing the optical disk, a reproduction light beam traces the track, the light beam reflected by the track is detected, and data reflected in this reflected light is reproduced. At this time, the reflected light contains wobble components. That is, a wobble signal can be extracted by detecting wobble components contained in the reflected light. Based on the frequency of the extracted wobble signal, a rotation control signal for a spindle motor and a clock signal used upon recording data can be generated. In this manner, accurate recording can be done without being influenced by rotational variations of the motor.

A predetermined number of recording fields 15 where data is rewritable upon recording data on the optical disk 10 are recorded on the spiral track. AS shown in FIGS. 2 and 4, each recording field 15 is comprised of a header field 19 for storing address data of the recording field, and a data field 20 for storing various data (user data and the like). The recording field 15 normally records data for one ECC block. The ECC block will be described later. Once an address is recorded in the header field 19 upon, e.g., formatting, the address recorded in the header field 19 is never rewritten unless the disk is re-formatted. Re-formatting is executed when data cannot be read out from the header field 19. The contents of the data field 20 are written every time a write.

When the recording fields 15 are successively recorded on the track, one recording field 15 may cross an index header 12. That is, one recording field 15 is broken up into two recording fields across the index header 12. These two broken-up recording fields will be referred to as sub recording fields a 16 and b 17 hereinafter.

As described above, each recording field 15 is comprised of a header field 19 for storing its own address, and a data field 20 for storing various data. As shown in FIG. 5C, both the sub recording fields a 16 and b 17 can have header fields 19 and sub data fields 43 (45). Alternatively, as shown in FIG. 5A, the sub recording field a 16 may have header field 19 and sub data field 43, and the sub recording field a 17 may have a sub data field alone. In this case, sub data field have connection field. Note that the header fields 19 of the sub recording fields a 16 and b 17 store identical address data. Data for one ECC block to be recorded in the sub recording fields a 16 and b 17 is divisionally recorded in the sub data fields 43 and 45 of the sub recording fields a 16 and b 17.

Figure 5D:
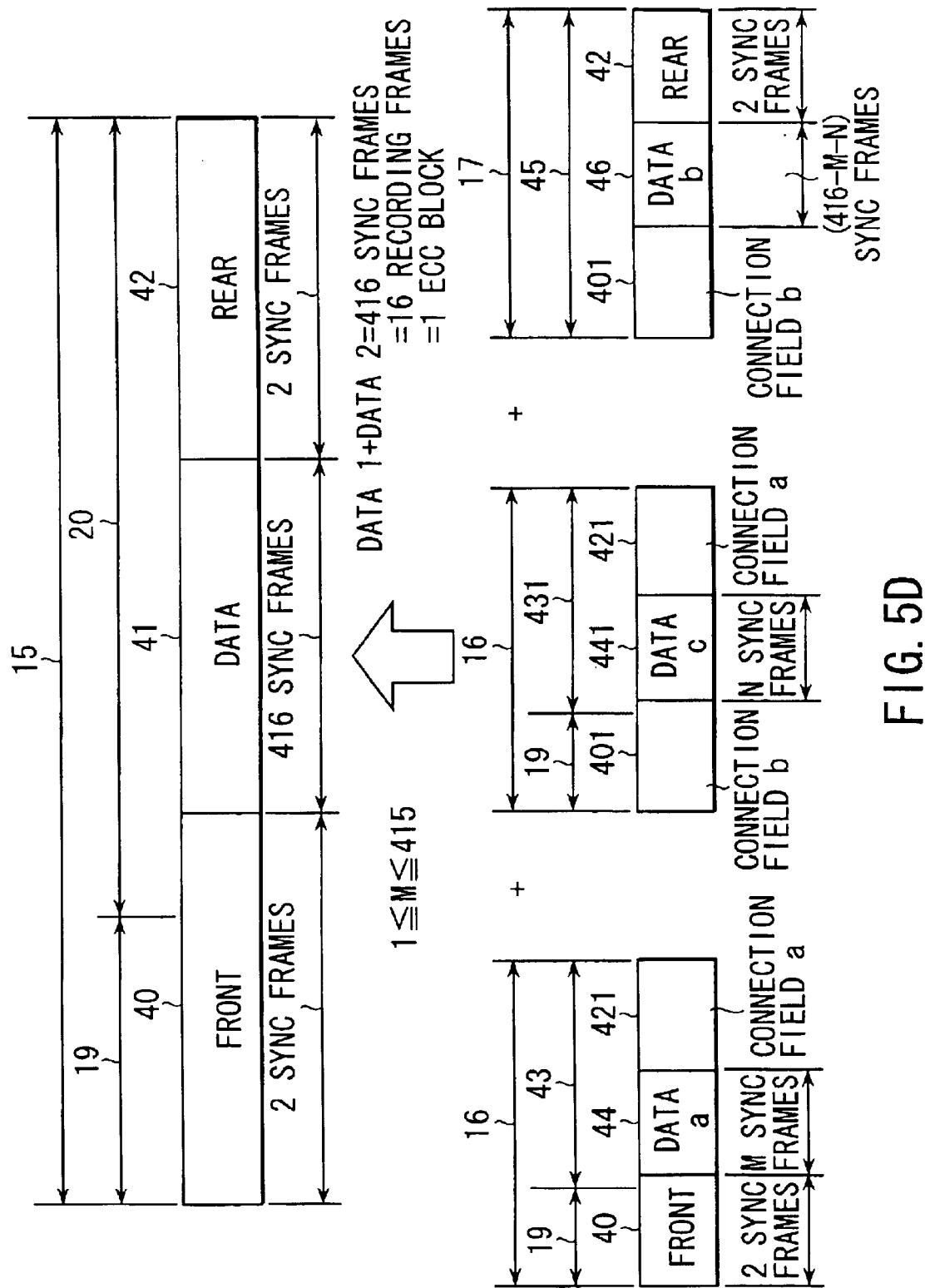

If a plurality of index headers 12 are arranged in each track or if one ECC block may have a size of 64K, the amount of data recorded in each recording field 15 will increase and the recording field 15 will therefore extend over two or more index headers. In this case, the recording field 15 is divided into three or more segments as is illustrated in FIG. 5D. Then, connection fields a421 and b401 may be made identical in structure to the rear 42 and front 40 of the recording field, respectively.

As shown in FIG. 3, the index header 12 has a plurality of header parts such as an Ha header 30, Hb header 31, Hc header 32, Hd header 33, and the like. These Ha header 30, Hb header 31, Hc header 32, and Hd header 33 are formed on an extended line of the subsequent track. Access to the groove track 13 uses the Ha header 30 and Hc header 32, and access to the land track 14 uses the Hb header 31 and Hd header 33. The Ha header 30 is comprised of a VFO field consisting of a successive pit train used to take synchronization, and an Ha 35 that records track address data.

Likewise, the Hb header 31 is comprised of a VFO field and Hb 36. Also, the Hc header 32 is comprised of a VFO field and Hc 37. Furthermore, the Hd header 33 is comprised of a VFO field and Hd 38. The Ha 35, Hb 36, Hc 37, and Hd 38 respectively contain information such as an AM (address mark), PID (physical ID), IED (error detection), PAD (pad), and the like. The VFO fields are formed on every track, but the Ha 35, Hb 36, Hc 37, and Hd 38 are formed on every other track (in FIG. 3, "-" indicates a land without any embossed pits). This is to avoid crosstalk from neighboring tracks. That is, when the Ha 35, Hb 36, Hc 37, and Hd 38 are formed on every track, signals from the Ha 35, Hb 36, Hc 37, and Hd 38 on the neighboring tracks interfere with each other. In this way, since the two headers (Ha 35 and Hc 37, or Hb 36 and Hd 38) are formed on each track, even when one header cannot be read due to a defect, the track can be specified using the other header.

The index headers 12 are aligned at only one position, i.e., a boundary between the land and groove tracks 14 and 13, as described above. Hence, the boundary between the land and groove tracks 14 and 13 can be detected by detecting the index headers 12.

The aligned index headers 12 and the spiral-shaped recording tracks in which the wobbled groove and land tracks 13 and 14 are alternately laid out are formed on the substrate of the optical disk 10. When a phase change recording film is formed on this substrate like, e.g., a DVD-RAM, a rewritable optical disk is obtained. When an optical disk formed with a recording film is initialized, the recording film of this optical disk is converted into a crystalline state. Upon irradiating the crystalline recording film with strong laser beam pulses, the irradiated portion is converted into an amorphous state. This is a data write process. By detecting the difference between reflectances of the crystalline and amorphous states, written data can be reproduced.

In general, defects on a rewritable optical disk are checked. As a checking scheme, predetermined data are written on the all tracks of the disk, and the written data are reproduced to check defects on the disk. When errors contained in the reproduced data cannot be corrected, and when errors of a predetermined level or higher are contained in the reproduced data, recording fields where these reproduced data are recorded are replaced by other recording fields. In defect inspection of the disk, since data must be recorded on the all tracks of the disk and must be reproduced, a very long time is required. Since this process is done by the disk manufacturer, the manufacturing cost increases consequently.

In order to avoid an increase in cost, a method of checking only large defects on the disk is available. In this method, for example, the disk surface is roughly checked using a light beam with a large spot size. At this time, checking by means of data write is done for only an area where directories are created, or is not done at all for some areas.

In a DVD-RAM, one recording field (one ECC block) is broken up into 16 physical sectors. Since each physical sector pre-records address data, data can be recorded in an arbitrary recording field. Since all physical addresses are determined as a default unless defect management is made, data can be recorded in an arbitrary recording field.

On the other hand, on the optical disk 10 of the present invention, address data of tracks are recorded as embossed patterns in the index headers 12. Hence, by reading address data recorded as embossed patterns in the index header, the position can be detected. In a default state, no recording fields are formed. However, since all recording fields can be determined based on the track address data recorded as embossed patterns in the index headers and the number of wobbles of the tracks. That is, by reading out track address data recorded as embossed pattern in the index headers and counting the number of wobbles, data can be written in an arbitrary recording field.

When computer data is recorded on a conventional optical disk, data is recorded on, e.g., the all tracks of the disk and defect management is done. When computer data is recorded on the optical disk 10 of the present invention, physical formatting is done first. That is, recording fields 15 are written on the all tracks of the optical disk 10. Upon recording the recording fields 15, header and data fields 19 and 20 are recorded. When one recording field 15 crosses a given index header, it is broken up into two sub recording fields when it is recorded. That is, one recording field 15 is broken up into two sub recording fields to have the index header as a boundary.

FIG. 4 shows details of the recording field 15. The header field 19 is made up of two headers, i.e., headers a and b, and a mirror field. Each header consists of 46 bytes, and its structure is the same as that of one index area included in the index header. The mirror field is used to detect the boundary between the header and data fields. Once a header field is recorded, it is never rewritten unless the optical disk 10 is re-formatted. Once a header field is recorded, the address of each recording field is determined from this header, and the index headers and wobbles are used as auxiliary address data.

The data field 20 is made up of GAP, Guard1, VFO, PS, DATA, PA, Guard2, and Buffer. GAP is used to absorb unstable laser power at the beginning of recording and to randomly shift the recording positions. J stores a random number ranging from 0 to 15 every time data is rewritten. In this manner, the recording start and end positions are randomly shifted. GAP records the same signal as that in, e.g., VFO. Guard1 is used to take preventive measure against deterioration that appears at the leading edge of a recorded signal after recording is repeated a large number of times. K stores a random number ranging from 0 to 7. This Guard1 also stores the same signal as that in, e.g., VFO. VFO stores a PLL sync signal, PS stores a pre-sync signal, and DATA stores data for one ECC block. PA is a postamble. Guard2 is used to take preventive measure against deterioration that appears at the trailing edge of a recorded signal. K stores a random number ranging from 0 to 7, and the same K value as that of Guard1 is used. This Guard1 also stores the same signal as that in, e.g., VFO. Buffer is used to absorb recording field lengths extended or shortened due to eccentricity of the disk and rotational variations of the disk (as well as differences among zones), and to randomly shift the recording positions. This Buffer has an area of at least 2 bytes or more where no signal is recorded. J assumes a value ranging from 0 to 15, and the same value as J of GAP is used.

When recording fields 15 are recorded for the first time upon physical formatting, header a to Guard2 in each header field 19 are successively recorded. In the second or subsequent recording, GAP to Guard2 are rewritten. In practice, the same signal as in VFO is recorded from halfway through the GAP field, and recording comes to an end in Gaurd2. Therefore, the recording field includes a signalless area of 2 bytes or more in at least the mirror field and Buffer field.

Figure 6:
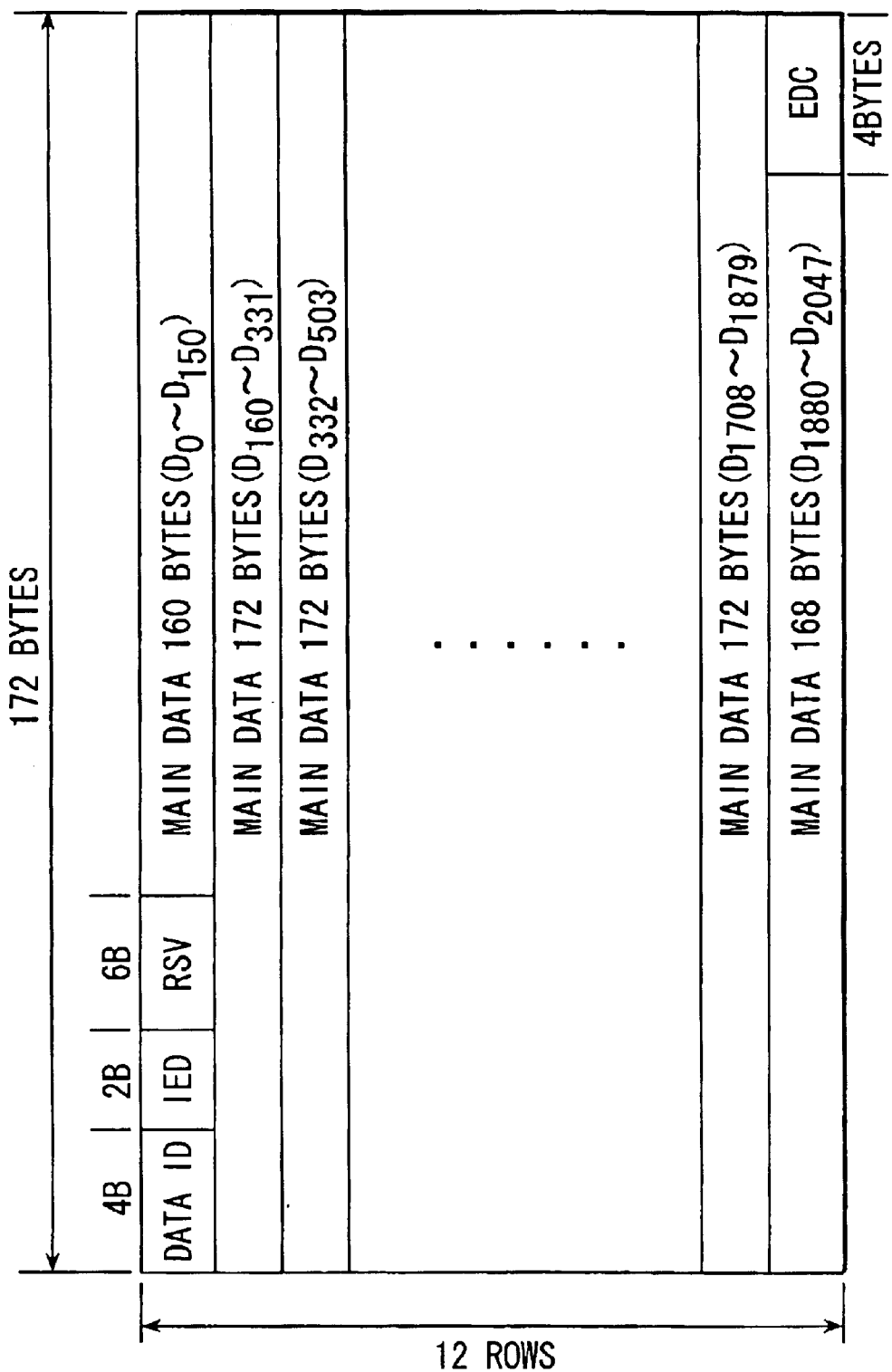
FIG. 6 shows the data structure of data frames that form an ECC block recorded in the recording field and sub recording fields recorded on the spiral track formed on the optical disk shown in FIG. 1.
Figure 8:
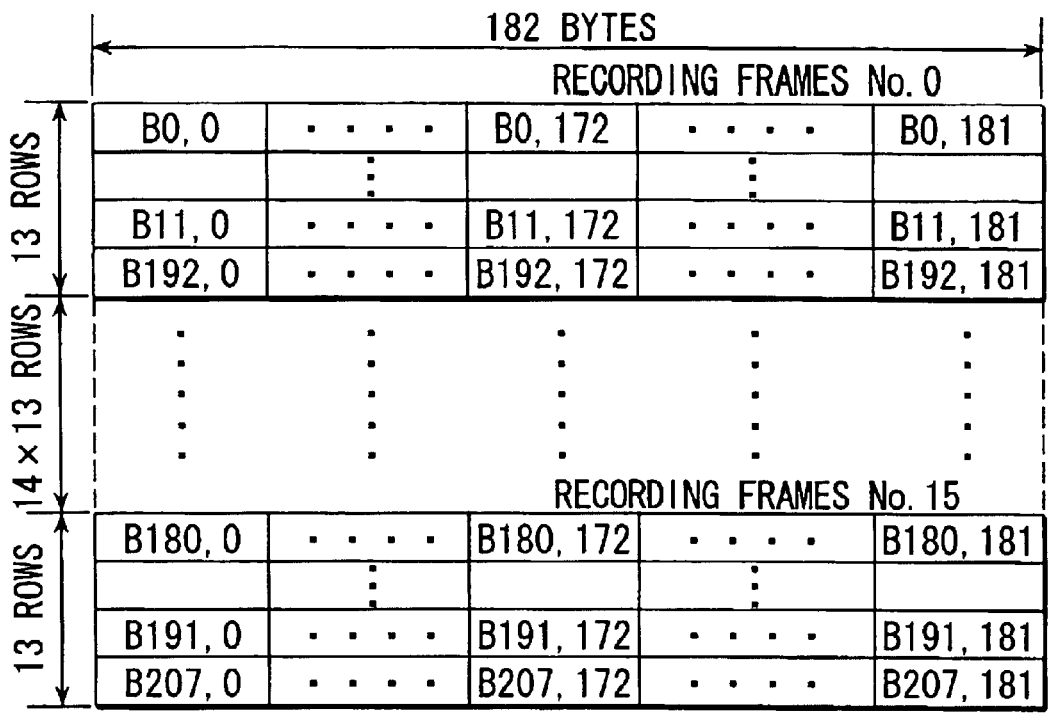
FIG. 8 shows the data structure of an interleaved ECC block recorded in the recording field and sub recording fields recorded on the spiral track formed on the optical disk shown in FIG. 1.

An ECC block will be explained below taking a DVD as an example. FIG. 6 shows a data frame consisting of 172 bytes×12 rows (2,064 bytes). This data frame consists of 2,048-byte main data, a 4-byte data ID indicating the ID of the data frame, a 2-byte IED used to detect any errors from this data ID, a 6-byte RSV (RESERVE), and a 4-byte EDC used to detect any errors from the main data. The main data has been scrambled to prevent "0" or "1" runs.

The ECC block used as a recording unit of a DVD-ROM and DVD-RAM is made up of 16 data frames including scrambled main data, and consists of 172 bytes×192 rows, as shown in FIG. 7. In addition to these data frames, as error correction codes, a 10-byte inner code PI is appended to each row and a 16-row outer code PO to each column. Hence, the entire ECC blocks consists of 182 bytes×208 rows. In order to improve correction performance of block errors, the ECC block is broken up into 16 recording interleaved recording frames each including PO for one row.

Figure 9:
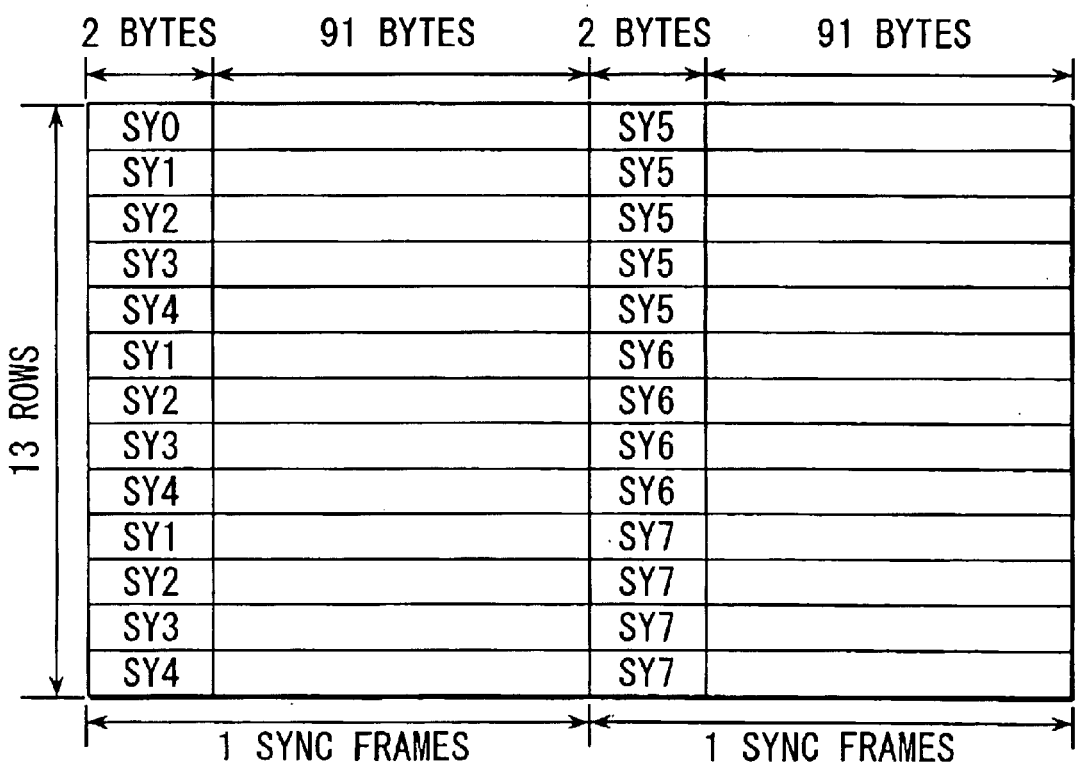
FIG. 9 shows the data structure of recording frames after sync codes (2B) are appended.

The recording frames undergo 8–16 modulation in units of rows, and 2 sync bytes are appended thereto every 91 bytes, as shown in FIG. 9. As a result, the recording frame has two 93-byte sync frames per row, and consists of a total of 26 sync frames (2,418 bytes).

On a DVD-ROM, these 26 sync frames that form one recording frame and 16 recording frames that form one ECC block (38,688 bytes) are successively arranged on the track. At this time, the format efficiency is 84.7%.

On the other hand, on a DVD-RAM, these 26 sync frames are recorded in one physical sector. Each physical sector has a structure similar to that shown in FIG. 4, and consists of a 130-byte header field and a 2,567-byte recording field. Since the total length of each sector is 2,697 bytes (29 sync frames) that include 2,048 bytes of data, the format efficiency is 75.9%.

Note that each track of the DVD-RAM is formed by a wobbled land and groove except for the header field of each physical sector. The number of wobbles per sync frame is 8.

Since one ECC block consists of 16 recording frames, it is formed by 416 sync frames.

Since this embodiment uses the same values as those of the DVD-RAM for the sync frames, recording frames, and ECC block size, one sync frame consists of 93 bytes and 8 wobbles, one recording frame consists of 26 sync frames, and one ECC blocks consists of 416 sync frames. As has been explained above, the index header 12 has a 2-sync frame length.

The recording field 15 is made up of a header field 19 and data field 20, and consists of a total of 420 sync frames, as shown in FIG. 4. Of these sync frames, a data portion for one ECC block consists of 416 sync frames. If the front and rear parts of this recording field except for the data portion for one ECC block are respectively called FRONT and REAR, one recording field is made up of a data portion, and FRONT and REAR each consisting of 2 sync frames.

FIG. 5A shows handling of sub recording fields when the recording field crosses an index header 12. The field before the index header is the sub recording field a 16, and the field after the index header is the sub recording field b 17. The sub recording field a 16 consists of a header field 19 and a sub data field 43. The sub data field 43 has connection field a. The sub recording field 17 consists of a sub data field 45. The sub data field 45 has connection field b. Data a 44 in the sub recording field a 16 consists of M sync frames ($1 \leq M < 415$). Hence, data b 46 in the sub recording field b 17 consists of (416−M) sync frames.

Connection field a stores a pattern indicating interruption of data. This pattern is similar to, for example, the postamble of the DVD-RAM. Connection field b stores a pattern indicating restart of data. This pattern is, for example, a pre-sync signal. If the postamble has 1 byte and the pre-sync signal has 3 bytes, the recording field 15 can be broken up into two sub recording field by appending only 4-byte information.

When laser power becomes unstable at the beginning of recording or when the recording position is randomly shifted, a GAP field is set in connection field b. Likewise, when a measure against deterioration that appears at the leading edge of a recorded signal after recording is repeated a large number of times must be taken, guard fields are set in connection fields a and b. Alternatively, in order to achieve PLL synchronization, a VFO field may be set in connection field b. Also, in order to prevent recorded data from extending across an index header, a buffer field may be set in connection field a. FIG. 5B shows the structure when connection fields a and b each for 1SF are assigned in the sub recording fields. When random shifts can be suppressed to some extent or when recorded data can be suppressed from extending across an index header to some extent, connection fields a and b can be further shortened.

Furthermore, a portion of connection field b is defined as a header field. This header field stores address data of the recording field. In this manner, reliability upon recording/reproducing data can be further improved. At this time, if connection fields a and b respectively have the same structures as REAR 42 and FRONT 40, the recording field and sub recording fields can have the same structure.

The present invention will be explained using practical numerical values. Assume that the wavelength of a violet laser is 405 nm, the NA of an objective lens is 0.66, the diameter of the optical disk is 120 mm, and the recording area ranges from 24.1 mm to 57.89 mm as in the DVD-RAM. Rotation control of the disk uses ZCLV as in the DVD-RAM. As for the number of zones, since physical sectors need not be aligned unlike the DVD-RAM, sectors (recording fields) can be freely set. In this embodiment, the number of zones is set to be 100 so as to suppress recording clock differences between adjoining zones to about 1% even when continuous write is made from the inner to outer periphery. Note that lead-in and lead-out areas respectively formed on the inner and outer sides of the recording area are omitted.

If the track pitch is set at 0.348 $\mu$m in consideration of cross erase with neighboring tracks, the total number of tracks is 97,000, and the number of tracks per zone (=the number of rounds) is 970. On the other hand, if the bit length is 0.159 $\mu$m, each track in zone 0 including the innermost track is 119,319 bytes per round, and has 1,283 sync frames. Of the 1,283 sync frames, two sync frames are assigned to the index header. FIG. 10 shows the relationship between the zone numbers and various parameters.

FIG. 11 shows the relationship between the tracks in zone 0 and recording fields. When three recording fields each consisting of 420 sync frames are written in track 0, the number of remaining frames of that track is 21. That is, a sub recording field for 21 sync frames is generated. In the sub recording field for 21 sync frames, four frames are assigned to FRONT and REAR, and 17 sync frames are assigned to a data portion. In next track 1, a sub recording field for 403 sync frames is generated. In the sub recording field for 403 sync frames, four frames are assigned to FRONT and REAR, and 399 sync frames are assigned to a data portion. That is, the sub recording field for 21 sync frames and the sub recording field for 403 sync frames respectively correspond to the sub recording fields a 16 and b 17 shown in FIG. 5A or 5C.

When two recording fields each consisting of 420 sync frames are recorded after the sub recording field for 403 sync frames, 38 sync frames remain. That is, a sub recording field for 38 sync frames is generated. In the sub recording field for 38 sync frames, four frames are assigned to FRONT and REAR, and 34 sync frames are assigned to a data portion. In next track 2, a sub recording field for 386 sync frames is generated. In the sub recording field for 386 sync frames, four frames are assigned to FRONT and REAR, and 382 sync frames are assigned to a data portion.

When the number of remaining sync frames becomes equal to or smaller than the number of sync frames (4 sync frames)) assigned to FRONT and REAR, these remaining sync frames are not assigned to a sub recording field. That is, the remaining sync frames are not assigned to a recording field. Instead, the remaining sync frames are assigned to a buffer or VFO field. The next track starts from a recording field.

When this process is repeated, the layout of all recording fields and sub recording fields in zone 0 is determined. When this process is repeated until zone 99, the layout of recording fields and sub recording fields on the entire disk is uniquely determined. The format efficiency is around 83.7% if it is computed using zone 49 which is located nearly at the center of the recording area. This value is about 1% lower than 84.7% of the DVD-ROM and is greatly improved compared to 75.9% of the DVD-RAM.

An optical disk apparatus for recording and reproducing data by driving the aforementioned optical disk 10 will be explained below using FIG. 12.

Figure 12:
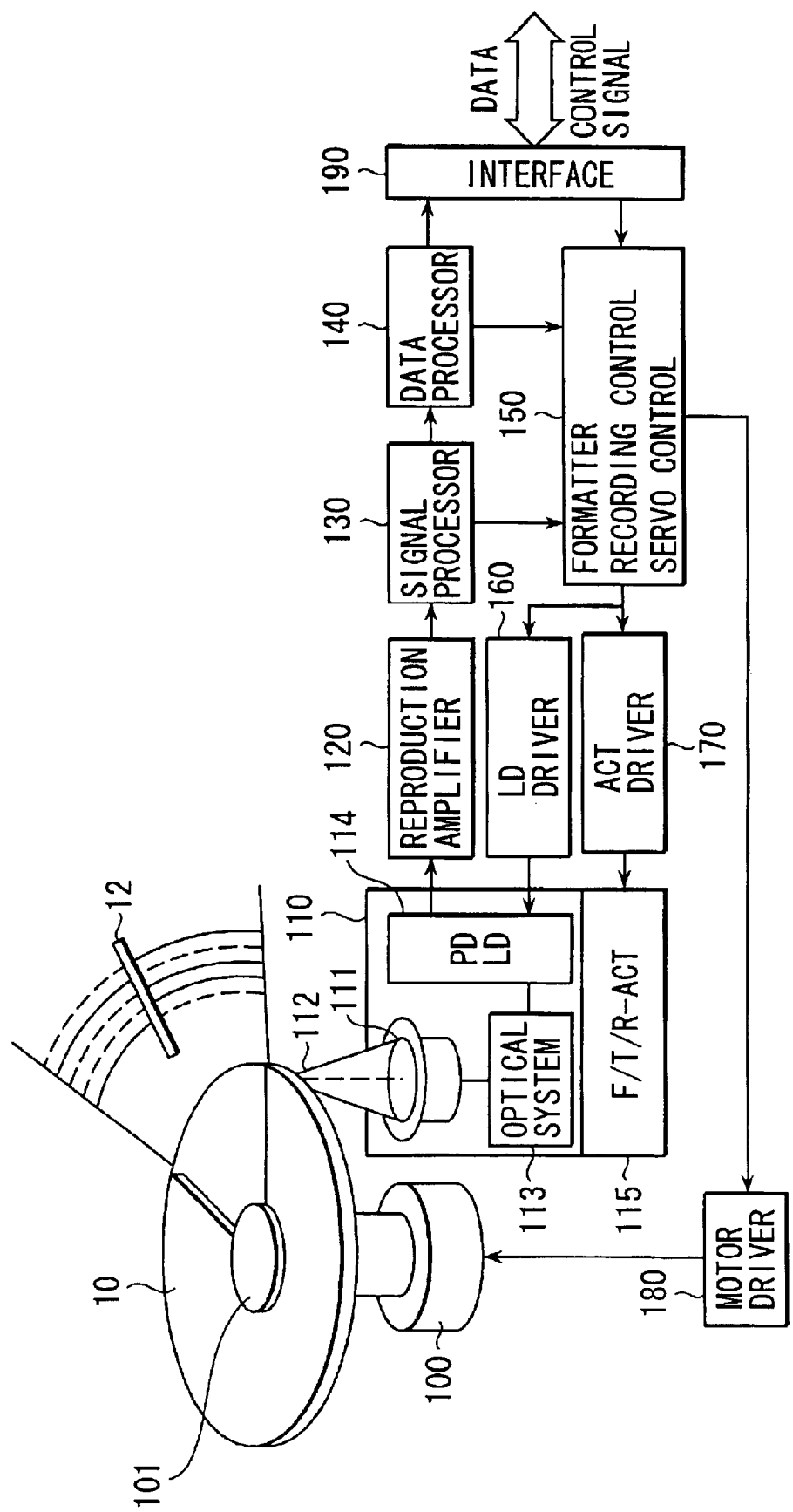
FIG. 12 is a schematic block diagram showing an optical disk driving apparatus according to an embodiment of an information recording apparatus and information reproduction apparatus of the present invention.

Referring to FIG. 12, the optical disk 10 is mounted on a spindle motor 100 by the clamp hole 11 and a clamper 101. The spindle motor 100 is driven by a motor driver 180. An optical head 110 opposes the rotating optical disk 10, and recording/reproduction on the optical disk 10 is achieved by a light beam emitted by the optical head 110.

The optical head 110 comprises an objective lens 111, a lens actuator 115 for moving this objective lens 111 in the focus direction and radial direction of the disk, an optical system 113 for recording and reproduction, a violet semiconductor laser LD, a multi-split photodetector 114 for extracting a reproduction signal from light reflected by the disk, and the like. The entire optical head 110 is moved in the radial direction of the disk 10 by a radial feed actuator 115.

Light emitted by the semiconductor laser LD passes through the optical system 113 and is focused on the optical disk 10 by the objective lens 111. Light reflected by the disk enters the multi-split photodetector 114 via the objective lens 111 and head optical system 113 in an order opposite to the aforementioned order. The multi-split photodetector 114 includes a two-split push-pull detector for detecting a tracking error signal, and the groove and land tracks 13 and 14 are tracked using a signal detected by the two-split push-pull detector. Switching between groove tracking and land tracking can be implemented by changing the polarity of the tracking error signal at the position of the index header 12 (at the detection timing of the index header 12). A servo signal from the photodetector is processed by a reproduction amplifier 120 and signal processor 130, and a controller 150 generates a control signal, which is supplied to an ACT driver 170. That is, the controller 150 serves as a tracking control means.

An RF reproduction signal is read by collecting all light components that enter focus and tracking detectors. The RF reproduction signal is amplified by the reproduction amplifier 120, and is then sent to the signal processor 130. A wobble signal is superposed on this RF reproduction signal, and the wobble signal alone can be easily separated using a low-pass filter. A reproduction signal of data can be separated using a high-pass filter that does not pass the wobble signal.

The detected wobble signal is 8 cycles per sync frame, and wobbles for 10,248 cycles are formed in innermost zone 0 except for two sync frames of the index header. Rotation of the spindle motor 100 is controlled by a rotation control signal obtained by frequency-dividing this wobble signal. For this reason, since rotation of the spindle motor 100 is synchronized with the wobble signal of the disk, a small buffer need only be prepared upon data recording. The rotation control signal is generated by the controller 150. That is, the controller 150 serves as a rotation control means.

On the other hand, a clock signal used in recording uses the wobble signal multiplied by a constant. That is, the frequency of a recording clock signal is determined based on that of the wobble signal. Since 8–16 modulation uses channel bits per wobble, the recording clock signal is multiplied by 186. By generating the recording clock signal based on the wobble signal, the buffer length in the data field 20 can be shortened. This recording clock signal is generated by the controller 150. That is, the controller 150 serves as a control means for controlling the recording clock signal.

Figure 13:
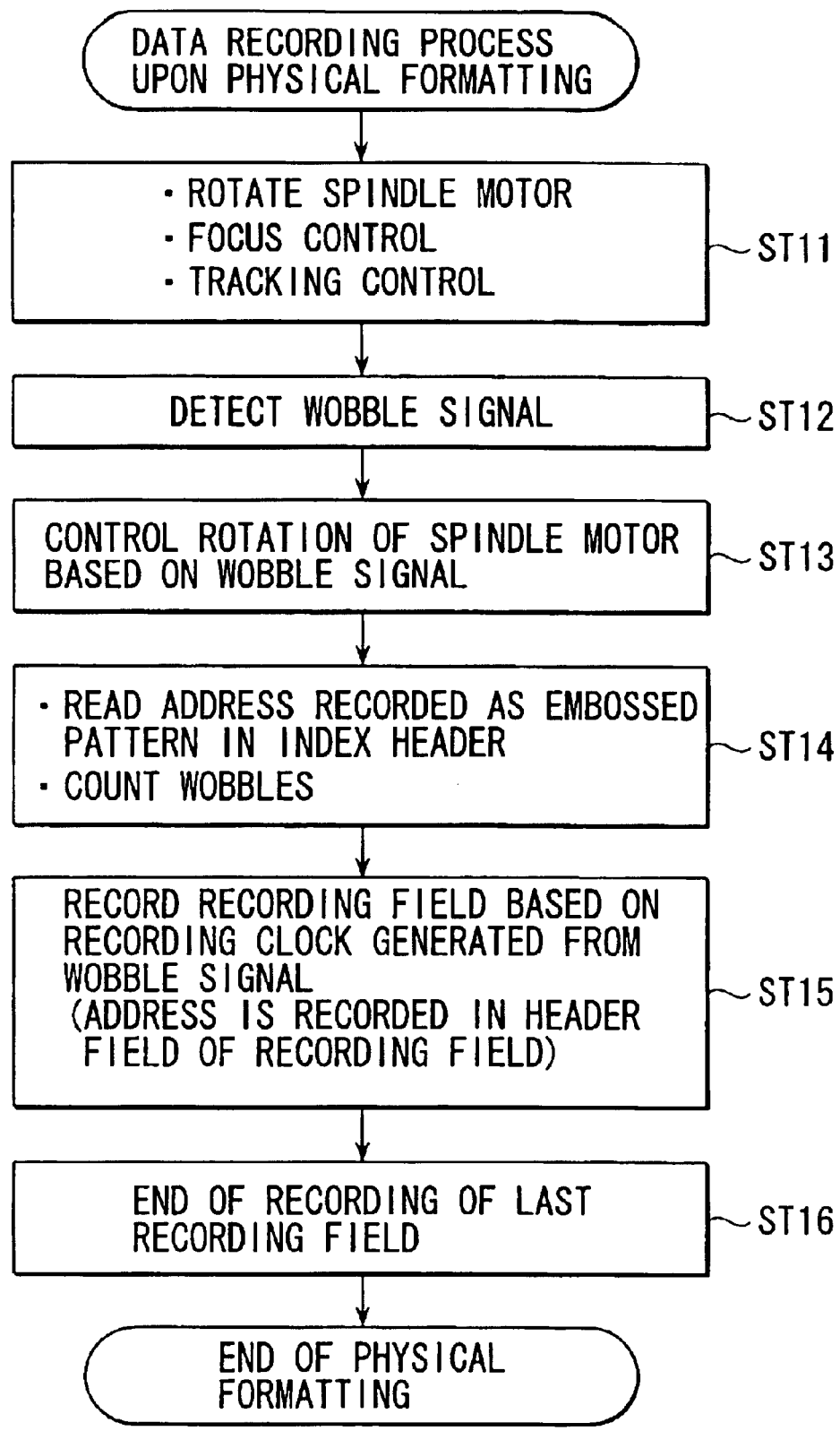
FIG. 13 is a flow chart showing a data recording process (recording of recording fields) executed upon physically formatting the optical disk shown in FIG. 1.

Physical formatting mainly for computer use will be explained below using the flow chart shown in FIG. 13. As has been explained above, 97,000 tracks are divisionally set in 100 zones, as shown in FIG. 10, and each track in each zone consists of a plurality of recording fields (including sub recording fields). The physical address of an arbitrary recording field is determined by a track address recorded as an embossed pattern in the index header and the number of wobbles starting from the index header.

The optical disk 10 is set in the optical disk apparatus, and the spindle motor 100 is rotated (ST11). Subsequently, focus control is executed (ST11). The optical head 110 is moved to the lead-in area located at the inner peripheral side while executing tracking control (ST11). In this state, the signal processor 130 detects a wobble signal (ST12), and rotation of the motor is controlled based on the wobble signal under the control of the controller 150 (ST13). When a physical formatting command is issued to the optical disk apparatus via an interface 190, the address recorded as an embossed pattern in each index header is read (ST14) to search for track 0 of zone 0. On the other hand, a formatter generates data to be recorded in the header and data fields 19 and 20 as preparation for write in the recording fields. Upon detection of an index header area corresponding to track 0 in zone 0, recording in recording field 0 immediately starts while counting wobbles by the signal processor 130 (ST14). The clock signal generated by the controller 150 uses a clock obtained by multiplying the wobble signal by a constant (ST15), and a signal read out from the formatter is input to an LD driver 160, thus starting recording on the optical disk 10. The optical head 110, LD driver 160, controller 150, and the like which serve as a recording means record data on the optical disk 10. The address of the recording field is incremented, and recording fields undergo recording in turn (ST15). After the last recording field in zone 99 undergoes recording (ST16), write of a format signal is complete. Data recorded in the data portion in the recording field are used to inspect the optical disk for any defects, and identical data are recorded in all the data fields.

After physical formatting, it is checked if data recorded in the header and data fields of the recording fields can be normally reproduced. That is, a defect management process is executed. If data recorded in the header field of a given recording field cannot be normally read, or when errors contained in data recorded in the data field are larger than a predetermined reference value, that recording field is replaced by a spare recording field prepared for the defect process.

In this way, when the all tracks of the disk is physically formatted and undergoes defect inspection before the user records data like in normal optical disks, all physical addresses of this optical disk are determined. For this reason, when the user records actual data, the optical disk apparatus can detect the address recorded in the header field of each recording field. Address data obtained from the index header and wobble signal is used as reference address data.

Figure 14:
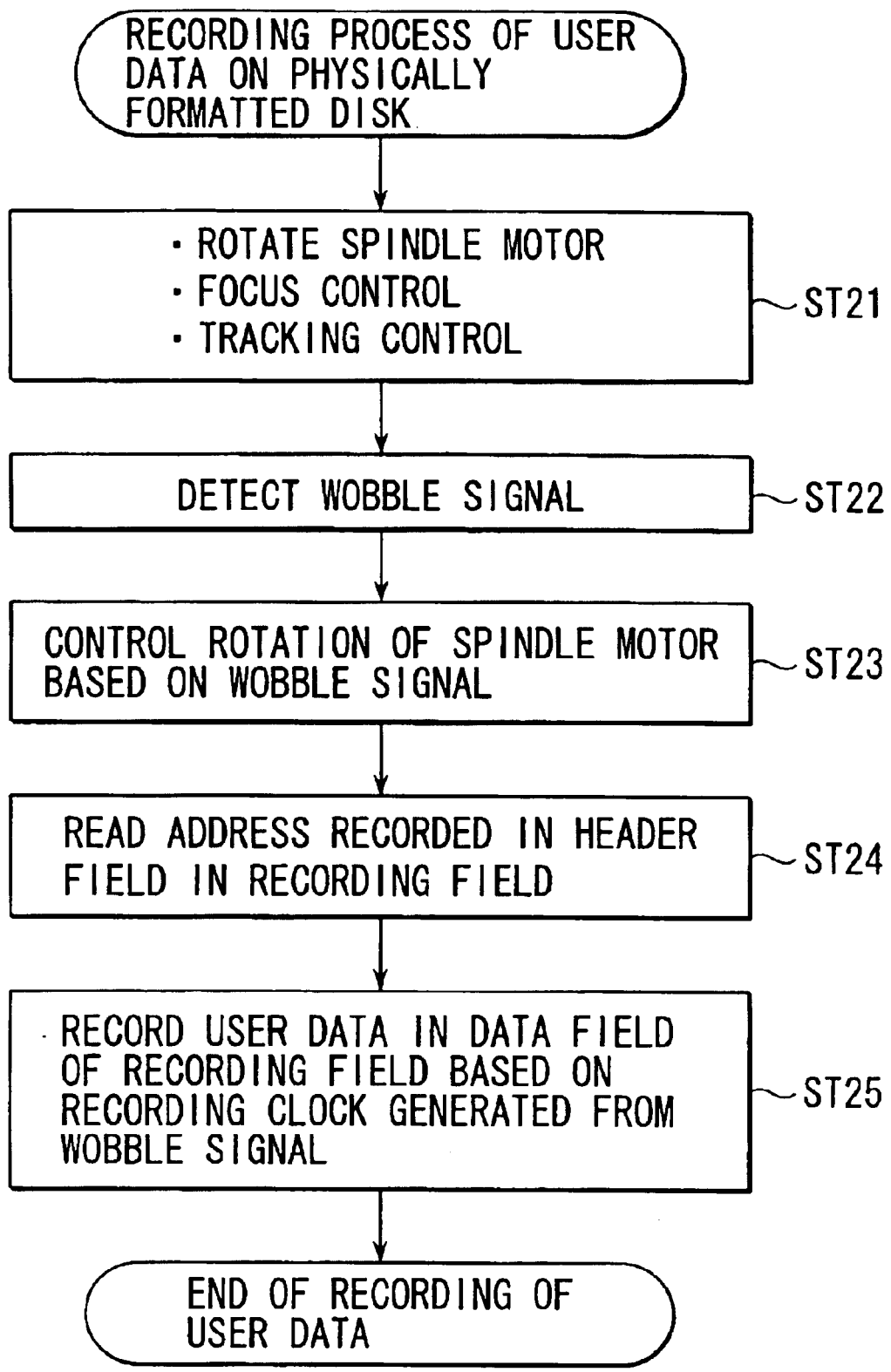
FIG. 14 is a flow chart showing a recording process for recording user data on the physically formatted optical disk.

Recording of user data on the disk that has undergone physical formatting, as described above, will be explained below with reference to the flow chart shown in FIG. 14.

The optical disk 10 is set in the optical disk apparatus, and the spindle motor 100 is rotated (ST21). Subsequently, focus control is executed (ST21). The optical head 110 is moved to the lead-in area located at the inner peripheral side while executing tracking control (ST21). In this state, a wobble signal is detected (ST22), and rotation of the motor is controlled based on the wobble signal (ST23). When a user data recording command is issued to the optical disk apparatus via the interface 190, address data recorded in the header field in each recording field is read (ST24) to access a target recording field. The user data is recorded on the basis of recording clocks generated by the controller 150 based on the wobble signal (ST25).

More specifically, upon recording data in the recording fields after physical formatting, the address of the recording field as a destination is determined based on recording data received via the interface 190, and a data sequence to be recorded in the data field is determined. Then, a recording field that matches the determined address is searched for, and when a target recording field is found, data is written in the data field of that target recording field. When the target recording field crosses an index header (the target recording field extends across an index header), data is written while breaking up the recording field into sub recording fields. Information that pertains to recording fields formatted on the disk is stored in the formatter. When the logical address of the recording field is designated and data recording is instructed, data is recorded in the recording field corresponding to this logical address. All these processes are controlled by the controller 150.

The process for formatting the all tracks of the optical disk and checking the all tracks for defects requires a very long time. When the disk manufacturer checks the disk for defects, the manufacturing cost of the disk increases consequently. It is troublesome for the user to check the disk for defects upon using the B disk. Depending on the use purpose of the disk, defect checking over the all tracks is not always required. On the optical disk of the present invention, data can be randomly written at an arbitrary position, and continuous data such as video data can be seamlessly recorded.

Assume that only an area of the disk where file directories are recorded, and the remaining area where no data is written remains unformatted. Data is recorded on the unformatted area. The formatter (controller) 150 has an address space determined by the index headers and the number of wobbles. When data is written in an area where a recording field is already recorded, data is recorded in only the data field of the recording field. On the other hand, when no recording field is recorded, a recording field (header and data fields) is recorded, and data is recorded in the data field of that recording field.

When the disk is not physically formatted, recording fields (header and data fields) are recorded using the address space of the controller 150 (formatter). Of course, data received by the interface is recorded in a data portion of the data field.

Figure 15:
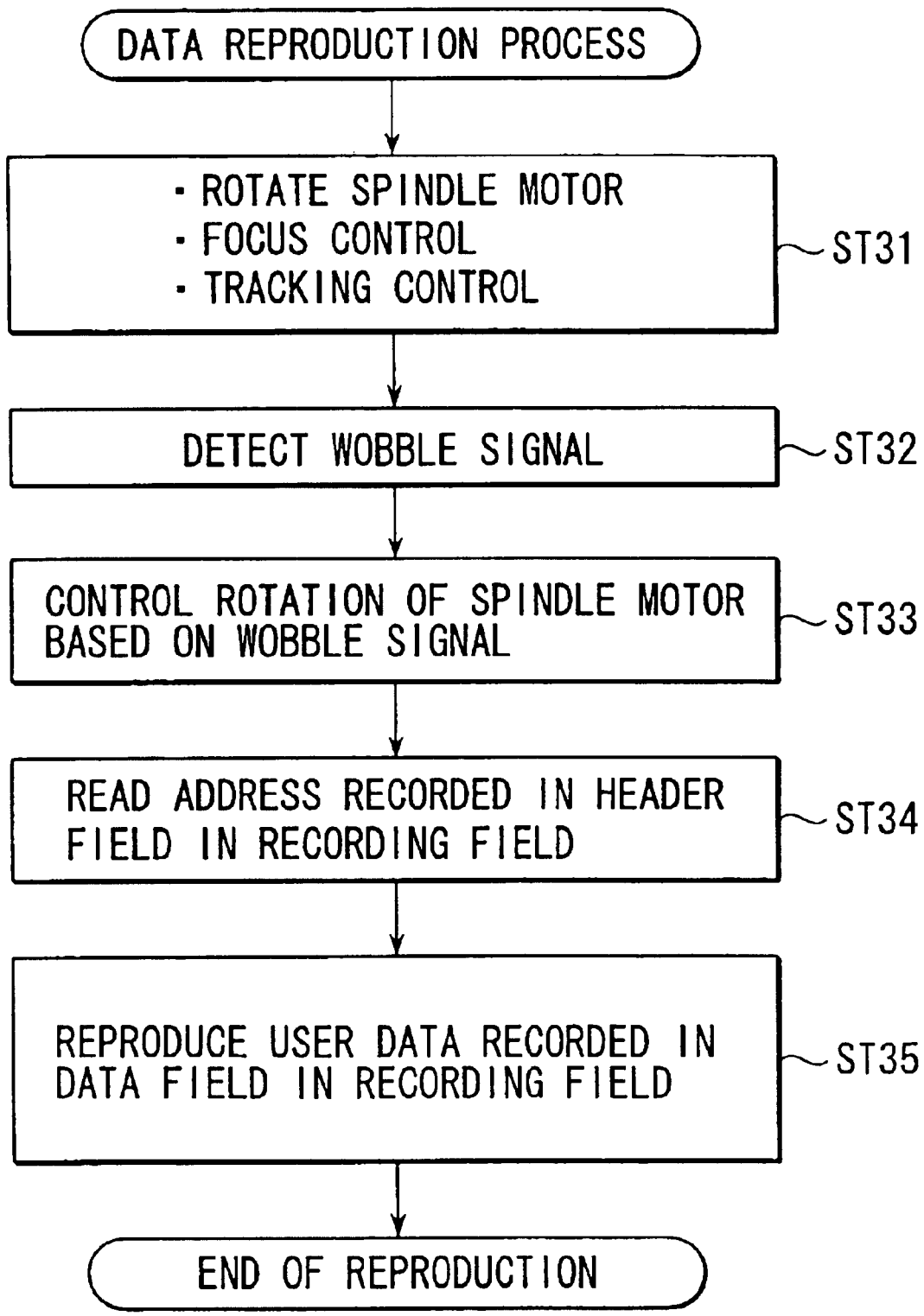
FIG. 15 is a flow chart showing a reproduction process for reproducing user data from the optical disk on which the user data have been recorded.

The reproduction process of data recorded on the optical disk 10 will be described below with reference to the flow chart shown in FIG. 15.

The optical disk 10 is set in the optical disk apparatus, and the spindle motor 100 is rotated (ST31). Subsequently, focus control is executed (ST31). The optical head 110 is moved to the lead-in area located at the inner peripheral side while executing tracking control (ST31). In this state, the signal processor 130 detects a wobble signal (ST32), and rotation of the motor is controlled based on the wobble signal under the control of the controller 150 (ST33). When a user data reproduction command is issued to the optical disk apparatus via an interface 190, the address recorded in the header field of the recording field is read (ST34) to access a target recording field. User data recorded in the data field of the target recording field is reproduced on the basis of reproduction clocks generated by the controller 150 based on own signal or the wobble signal (ST35). More specifically, the optical head 110, the reproduction amplifier 120, the signal processor 130, a data processor 140, and the like which serve as a reproduction means reproduce data recorded on the optical disk 10.

In this embodiment, the disk that uses land & groove recording has been explained. For this reason, the track changes from a groove to land and vice versa at the index header position in units of rounds. That is, the polarity of tracking servo is switched to have the index header position as a boundary. However, even when the polarity is switched, the actual head position is smoothly connected, the position of the head in the radial direction remains unchanged.

In this embodiment, land & groove recording is used, and the single spiral scheme that switches the land and groove every round has been explained. However, the present invention can be applied to various other recording tracks, e.g., a double spiral scheme. In the double spiral scheme upon switching from a land to groove or vice versa, the head moves for one track in the radial direction. In such case, a margin time is required until the head position settles, and a dummy area therefor must be assured in the index header.

When a recording medium or recording scheme that can increase the linear density is used, groove or land recording alone may be used in place of land & groove recording. In such case, only servo polarity switching is omitted, and the present invention can be similarly applied.

In this embodiment, the rewritable optical disk has been explained. However, the present invention can be similarly applied to a medium such as a DVD-R, write-once disk, and the like on which data can be recorded only once.

In this embodiment, the ECC block (32 kbytes: 416 sync frames) used in the DVD is used as an example of the data recording unit. When the recording density increases, ECC must be further strengthened and, in general, the ECC block size increases. When the ECC block size becomes 64 kbytes, the recording field size increases accordingly, and other fields become small relative to the data portion. Therefore, by applying the present invention, the format efficiency can be further improved.

In this embodiment, a total of four sync frames are used for FRONT and REAR of the recording field, but the present invention is not limited to such specific structure.

In this embodiment, the rewritable optical disk has been explained. In order to assure compatibility between the rewritable optical disk and a ROM disk, the ROM disk may adopt the base format of the present invention. On the other hand, a disk which includes both a ROM area and a rewritable area may adopt the base format of the present invention.

On the optical disk of the present invention, data can be recorded at arbitrary positions without any losses. In other words, data can be recorded at high format efficiency. On the optical disk of the present invention, even a large amount of continuous data such as video data can be seamlessly written, and even small files in units of ECC blocks can be efficiently recorded.

According to the present invention, the physical address of each recording field is determined based on the index header which is formed on the optical disk at one position per round and wobbles formed on the track. When a recording field crosses an index header, it is broken up into two sub recording fields to have the index header as a boundary. In this manner, continuous recording extending over the index header can be done. The number of zones in each of which the rotational speed becomes constant does not depend on the number of physical sectors unlike in a DVD-RAM, and can be increased to be able to ignore rotation errors from neighboring zones.

Therefore, according to the present invention, data can be efficiently and randomly recorded in an arbitrary recording field of the disk in units of ECC blocks as a recording unit of data. Even for a large amount of data such as video data which are recorded to extend across a plurality of zones, no rotation wait time for adjusting the rotational speed in units of zones is required, thus allowing smoother seamless recording.

On the other hand, the format efficiency of the disk of the present invention is around 83.7%, and is greatly improved compared to 75.9% of that of the DVD-RAM. Since the format efficiency of the read-only DVD-ROM is 84.7%, the optical disk of the present invention allows both random and seamless recording processes at arbitrary positions while suffering only about 1% loss of the format efficiency compared to the DVD-ROM.

On the DVD-RAM, header data recorded as an embossed pattern in the header is recorded at a position a half track pitch offset from the extended line of the central line of the recording track. By contrast, on the optical disk of the present invention, address data recorded as an embossed pattern in the index header is recorded on the extended line of the central line of the recording track. This structure allows easy manufacture of the optical disk of the present invention, and also easy adjustment of an optical head for recording/reproducing data on/from the optical disk of the present invention.

The present invention can provide the following information recording medium, information recording apparatus, information recording method, information reproduction apparatus, and information reproduction method:

(1) an information recording medium with high recording efficiency and, more particularly, an information recording medium which can record a large amount of continuous data such as video data and also small fragments of data in units of ECC blocks such as PC data at arbitrary positions;

(2) an information recording apparatus and method which can record information on an information recording medium with high recording efficiency and, more particularly, an information recording medium which can record a large amount of continuous data such as video data and also small fragments of data in units of ECC blocks such as PC data at arbitrary positions so as to utilize features of the information recording medium; and (3) an information reproduction apparatus and method which reproduce information recorded on an information recording medium with high recording efficiency and, more particularly, an information recording medium which can record a large amount of continuous data such as video data and also small fragments of data in units of ECC blocks such as PC data at arbitrary positions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk-shaped information recording medium comprising:
    spiral tracks, and
    at least one index header which is aligned in a radial direction of a disk to partially intercept said spiral tracks,
    wherein said spiral tracks have a plurality of recording fields each having a predetermined track length,
    each of said recording fields has a header field and data field,
    said header field records address data,
    said data field records user data,
    a specific one of said recording fields is allocated to extend across said index header,
    the specific recording field has first and second sub recording fields to have said index header as a boundary, and
    said first and second sub recording fields respectively have connection fields for connecting the two sub recording fields.

2. A medium according to claim 1, wherein said index header has address data recorded as an embossed pattern.

3. A medium according to claim 1, wherein said index header has, along a track direction, a plurality of index header areas corresponding to respective rounds of tracks of said spiral tracks.

4. A medium according to claim 3, wherein each of said index header areas is allocated on an extended line of the corresponding round of track, and has address data of the corresponding round of track.

5. A medium according to claim 3, herein each of said index header areas has a plurality of header parts,
    a predetermined header part 1 of the plurality of header parts of the index header area corresponding to the n-th round of track of said spiral tracks has address data,
    a predetermined header part 2 of the plurality of header parts of the index header area corresponding to the (n+1)-th round of track of said spiral tracks has address data, and
    the header parts 1 and 2 are allocated at different positions in the radial direction.

6. A medium according to claim 1, wherein said first sub recording field has a first header field, said connection field of said second sub recording field has a second header field, and
said first and second header fields record identical address data.

7. A medium according to claim 1, wherein said information recording medium has a plurality of concentric zones, and
    each of said zones includes said spiral tracks which are wobbled.

8. A medium according to claim 7, wherein the number of wobbles per round of spiral tracks included in a specific zone is identical, and a disk rotational speed upon accessing the specific zone and a frequency upon recording data on the specific zone can be determined on the basis of a frequency reproduced from the wobbles of said spiral tracks.

9. A medium according to claim 1, wherein said spiral tracks are alternately switched to land- and groove-shaped tracks in units of rounds, and
    said index header is aligned at only a boundary between said land- and groove-shaped tracks.

10. A medium according to claim 1, wherein the address data recorded as an embossed pattern in said index header is used before said recording fields are allocated on said spiral tracks, or is additionally used after said recording fields are allocated on said spiral tracks, and
    the address data recorded in the header field in the recording field is used after that recording field is allocated on the spiral track.

11. An information recording apparatus for recording information on a disk-shaped information recording medium which comprises:
    spiral tracks, and
    at least one index header which is aligned in a radial direction of a disk to partially intercept the spiral tracks, and in which address data of a track is recorded as an embossed pattern,
    said apparatus comprising:
    first recording means for recording a recording field having a header field and data field on the spiral tracks on the basis of address data recorded as an embossed pattern in said index header, and recording address data of the recording field in the header field, and
    second recording means for recording a specific recording field extending across said index header,
    wherein the specific recording field has first and second sub recording fields to have said index header as a boundary, and
    the first and second sub recording fields respectively have connection fields for connecting the two sub recording fields.

12. An apparatus according to claim 11, further comprising data recording means for recording target data in the data field of the recording field on the basis of the address data recorded in the header field after said first recording means records the address data in the header field of the recording field.

13. An apparatus according to claim 11, further comprising data recording means for recording target data in the data field of the recording field on the basis of the address data recorded in the header field without rewriting the address data recorded in the header field after said first recording means records the address data in the header field of the recording field.

14. An apparatus according to claim 11, wherein the information recording medium has a plurality of concentric zones, each of the zones includes the spiral tracks which are wobbled, the number of wobbles per round of spiral tracks included in a specific zone is identical, the spiral tracks alternately have land- and groove-shaped tracks in units of rounds, the index header is aligned at only a boundary between the land- and groove-shaped tracks, and said apparatus further comprises:

tracking control means for controlling tracking to make a light beam track the land-and groove-shaped tracks by detecting the index header, first control means for controlling a disk rotational speed upon accessing a specific zone on the basis of a frequency reproduced from wobbles of the spiral tracks included in the specific zone, and second control means for controlling a frequency of data recording with respect to a specific zone on the basis of a frequency reproduced from wobbles of the spiral tracks included in the specific zone.

15. An information recording method for recording information on a disk-shaped information recording medium which comprises:

spiral tracks, and at least one index header which is aligned in a radial direction of a disk to partially intercept the spiral tracks, and in which address data of a track is recorded as an embossed pattern, said method comprising the step of:

recording a recording field having a header field and data field on the spiral tracks on the basis of address data recorded as an embossed pattern in said index header, and recording address data of the recording field in the header field, and recording a specific recording field extending across said index header, wherein the specific recording field has first and second sub recording fields to have said index header as a boundary, and said first and second sub recording fields respectively have connection fields for connecting the two sub recording fields.

16. A method according to claim 15, further comprising the step of recording target data in the data field of the recording field on the basis of the address data recorded in the header field after the address data is recorded in the header field of the recording field.

17. A method according to claim 15, further comprising the step of recording target data in the data field of the recording field on the basis of the address data recorded in the header field without rewriting the address data recorded in the header field after said the address data is recorded in the header field of the recording field.

18. A method according to claim 15, wherein the information recording medium has a plurality of concentric zones, each of the zones includes the spiral tracks which are wobbled, the number of wobbles per round of spiral tracks included in a specific zone is identical, the spiral tracks alternately have land- and groove-shaped tracks in units of rounds, the index header is aligned at only a boundary between the land- and groove-shaped tracks, and said method further comprises the steps of:

controlling tracking to make a light beam track the land- and groove-shaped tracks by detecting the index header, controlling a disk rotational speed upon accessing a specific zone on the basis of a frequency reproduced from wobbles of the spiral tracks included in the specific zone, and controlling a frequency of data recording with respect to a specific zone on the basis of a frequency reproduced from wobbles of the spiral tracks included in the specific zone.

19. An information reproduction apparatus for reproducing information from a disk-shaped information recording medium which comprises:

wobbled spiral tracks, and at least one index header which is aligned in a radial direction of a disk to partially intercept the spiral tracks, and in which address data of a track is recorded as an embossed pattern, and in which the spiral tracks have a plurality of recording fields each having a predetermined track length, each recording field has a header field and data field, the header field records address data, the data field records user data, a specific one of the recording fields is allocated to extend across the index header, the specific recording field has first and second sub recording fields to have the index header as a boundary, the first and second sub recording fields respectively have connection fields for connecting the two sub recording fields, the first sub recording field has a first header field, and the first header field records address data of the specific recording field, said apparatus comprising:

first data reproduction means for reproducing target data recorded in the data field of the recording field on the basis of the address data recorded in the header field of the recording field, and second data reproduction means for reproducing target data recorded in the data field of the specific recording field on the basis of the address data recorded in the first header field of the specific recording field.

20. An apparatus according to claim 19, wherein the information recording medium has a plurality of concentric zones, each of the zones includes the wobbled spiral tracks, the number of wobbles per round of spiral tracks included in a specific zone is identical, the spiral tracks alternately have land- and groove-shaped tracks in units of rounds, the index header is aligned at only a boundary between the land- and groove-shaped tracks, and said apparatus further comprises:

tracking control means for controlling tracking to make a light beam track the land-and groove-shaped tracks by detecting the index header, and control means for controlling a disk rotational speed upon accessing a specific zone on the basis of a frequency reproduced from wobbles of the spiral tracks included in the specific zone.

21. An information reproduction method for reproducing information from a disk-shaped information recording medium which comprises:

wobbled spiral tracks, and at least one index header which is aligned in a radial direction of a disk to partially intercept the spiral tracks, and in which address data of a track is recorded as an embossed pattern, and in which the spiral tracks have a plurality of recording fields each having a predetermined track length, each recording field has a header field and data field, the header field records address data, the data field records user data, a specific one of the recording fields is allocated to extend across the index header, the specific recording field has first and second sub recording fields to have the index header as a boundary, the first and second sub recording fields respectively have connection fields for connecting the two sub recording fields, the first sub recording field has a first header field, and the first header field records address data of the specific recording field, said method comprising the step of:

reproducing target data recorded in the data field of the recording field on the basis of the address data recorded in the header field of the recording field, and reproducing target data recorded in the data field of the specific recording field on the basis of the address data recorded in the first header field of the specific recording field.

22. A method according to claim 21, wherein the information recording medium has a plurality of concentric zones, each of the zones includes the wobbled spiral tracks, the number of wobbles per round of spiral tracks included in a specific zone is identical, the spiral tracks alternately have land- and groove-shaped tracks in units of rounds, the index header is aligned at only a boundary between the land- and groove-shaped tracks, and said method further comprises the steps of:

controlling tracking to make a light beam track the land- and groove-shaped tracks by detecting the index header, and controlling a disk rotational speed upon accessing a specific zone on the basis of a frequency reproduced from wobbles of the spiral tracks included in the specific zone.

23. A medium according to claim 1, wherein:

said first sub recording field has a first header field, and said first header field records address data of the specific recording field.

24. An apparatus according to claim 11, wherein:

said first sub recording field has a first header field, and said second recording means records address data of the specific recording field in said first header field.

25. An apparatus according to claim 11, wherein:

said first sub recording field has a first header field, said connection field of said second sub recording field has a second header field, and said second recording means records address data of the specific recording field in said first header field, and records the address data of the specific recording field in said second header field.

26. A method according to claim 15, wherein said first sub recording field has a first header field, and said method further comprises:

recording address data of the specific recording field in said first header field.

27. A method according to claim 15, wherein said first sub recording field has a first header field, and said connection field of said second sub recording field has a second header field, and said method further comprises:

recording address data of the specific recording field in said first header field, and the address data of the specific recording field in said second header field.

28. An apparatus according to claim 19, wherein:

the connection field of the second sub recording field has a second header field, the second header field records the address data of the specific recording field, and the second data reproduction means reproduce target data recorded in the data field of the specific recording field on the basis of the address data recorded in the first and second header field of the specific recording field.

29. A method according to claim 21, wherein the connection field of the second sub recording field has a second header field, the second header field records the address data of the specific recording field, and said method further comprises:

reproducing target data recorded in the data field of the specific recording field on the basis of the address data recorded in the first and second header field of the specific recording field.

* * * * *